United States Patent
Zhang

(10) Patent No.: US 9,990,236 B2
(45) Date of Patent: Jun. 5, 2018

(54) DIVIDING A STREAM COMPUTING APPLICATION GRAPH OF A SERVICE FOR SCHEDULING AND PROCESSING

(71) Applicant: Huawei Technologies Co., Ltd., Shenzhen (CN)

(72) Inventor: Songshan Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 14/982,375

(22) Filed: Dec. 29, 2015

(65) Prior Publication Data

US 2016/0110228 A1    Apr. 21, 2016

Related U.S. Application Data

(63) Continuation of application No. PCT/CN2014/094916, filed on Dec. 25, 2014.

(30) Foreign Application Priority Data

Jun. 17, 2014  (CN) .......................... 2014 1 0270392

(51) Int. Cl.
  *G06F 9/50* (2006.01)
  *G06F 17/30* (2006.01)
  (Continued)

(52) U.S. Cl.
  CPC ...... *G06F 9/5083* (2013.01); *G06F 17/30516* (2013.01); *G06F 17/30958* (2013.01); *H04L 29/08* (2013.01)

(58) Field of Classification Search
  None
  See application file for complete search history.

(56) References Cited

U.S. PATENT DOCUMENTS 8,332,862 B2  12/2012  Isard et al.
8,490,072 B2   7/2013  Andrade et al.
(Continued)

FOREIGN PATENT DOCUMENTS

CN  102521051 A  6/2012
CN  103631659 A  3/2014
(Continued)

OTHER PUBLICATIONS

Foreign Communication From a Counterpart Application, Chinese Application No. 201410270392.3, Chinese Office Action dated Nov. 16, 2016, 7 pages.
(Continued)

*Primary Examiner* — Eric C Wai
(74) *Attorney, Agent, or Firm* — Conley Rose, P.C.

(57) ABSTRACT

A service scheduling method, applied to a stream computing system, is presented. The stream computing system includes a master control node and multiple working nodes, and the master control node is configured to schedule sub-services included in the service to the multiple working nodes for processing. The method includes acquiring a stream computing application graph of the service; dividing the stream computing application graph according to operator degrees and operator potentials of operators in the stream computing application graph and according to a division quantity for dividing the stream computing application graph, to obtain divided sub-graphs with the division quantity; and scheduling a sub-service corresponding to an operator included in each divided sub-graph to a working node corresponding to the divided sub-graph for processing. The method provided in embodiments of the present disclosure can enable services to use physical resources and network resources in a balanced manner.

21 Claims, 9 Drawing Sheets

(51) Int. Cl.
    *G06F 9/46*         (2006.01)
    *H04L 29/08*       (2006.01)

(56) References Cited

U.S. PATENT DOCUMENTS

| | | |
|---|---|---|
| 2010/0229178 A1 | 9/2010 | Ito |
| 2010/0325621 A1 | 12/2010 | Andrade et al. |
| 2011/0047555 A1 | 2/2011 | Lakshmanan et al. |

FOREIGN PATENT DOCUMENTS

| | | |
|---|---|---|
| CN | 103838627 A | 6/2014 |
| CN | 104052811 A | 9/2014 |

OTHER PUBLICATIONS

Partial English Translation and Abstract of Chinese Patent Application No. CN103631659, Dec. 4, 2015, 5 pages.
Partial English Translation and Abstract of Chinese Patent Application No. CN104052811, Dec. 4, 2015, 4 pages.
Foreign Communication From a Counterpart Application, PCT Application No. PCT/CN2014/094916, English Translation of International Search Report dated Mar. 31, 2015, 2 pages.
Foreign Communication From a Counterpart Application, PCT Application No. PCT/CN2014/094916, Written Opinion dated Mar. 31, 2015, 7 pages.
Foreign Communication From a Counterpart Application, European Application No. 14893697.4, Extended European Search Report dated Jul. 21, 2016, 8 pages.

DIVIDING A STREAM COMPUTING APPLICATION GRAPH OF A SERVICE FOR SCHEDULING AND PROCESSING

CROSS-REFERENCE TO RELATED APPLICATIONS

This application is a continuation of International Application No. PCT/CN2014/094916, filed on Dec. 25, 2014, which claims priority to Chinese Patent Application No. 201410270392.3, filed on Jun. 17, 2014, both of which are hereby incorporated by reference in their entireties.

TECHNICAL FIELD

The present disclosure relates to the field of computer technologies, and in particular, to a service scheduling method, apparatus, and system.

BACKGROUND

Real-time stream computing refers to processing data immediately once the data occurs, that is, performing one processing operation when one event occurs, rather than buffering the events and processing them in batches, for example, a commercial search engine.

A stream computing application model includes operators and streams. The operator (operator) is a data processing unit that carries service logic, and is a minimum unit that can be scheduled and executed in a distributed manner by a stream computing platform. The stream (stream) is data exchanged between operators.

After a service application written based on a stream data processing model is scheduled by a master control node of a stream computing system, the service application runs in a distributed manner on the stream computing platform. The stream computing platform includes a master control node and a physical node for running a service.

Scheduling performed by a stream processing system is carried on mainly according to three key factors of 1. A service model (a service application that runs on a stream computing platform, which is a topology graph); 2. Physical resources (computing resources such as a memory and a central processing unit (CPU) of a physical node in a platform cluster); and 3. Network transmission resources (a network throughput and bandwidth resources in the platform cluster).

The above three factors affect and interfere with each other. Distribution of the service models determines consumption of the physical resources; the consumption of the physical resources affects a network transmission delay; and the network transmission delay further affects task execution efficiency.

An existing stream computing system in the industry basically schedules a task to a physical resource randomly, and performs stream application scheduling without considering the above three factors, which causes unbalanced use of resources when a service is deployed to a platform for running.

SUMMARY

Embodiments of the present disclosure provide a service scheduling method, which can distribute services to working nodes in a balanced manner, so as to obtain physical resources and network resources in a balanced manner, thereby improving utilization of the physical resources and network resources. The embodiments of the present disclosure further provide a corresponding apparatus and system.

A first aspect of the present disclosure provides a service scheduling method, applied to a stream computing system, where the stream computing system is configured to schedule and process a service, the stream computing system includes a master control node and multiple working nodes, and the master control node is configured to schedule sub-services included in the service to the multiple working nodes for processing; and the method includes acquiring a stream computing application graph of the service, where the stream computing application graph is a logical relationship graph that is created in advance for the service and that includes operators and moving directions of data streams between the operators, and the operator in the stream computing application graph carries computational logic used for processing a sub-service that is in the service and that is corresponding to the operator; dividing the stream computing application graph according to operator degrees and operator potentials of the operators in the stream computing application graph and according to a division quantity for dividing the stream computing application graph, to obtain divided sub-graphs with the division quantity, where the operator degree is a cumulative sum of traffic weights of input-and-output traffic of the operator, and the operator potential is a load degree of the operator in the stream computing application graph; and scheduling a sub-service corresponding to an operator included in each divided sub-graph to a working node corresponding to the divided sub-graph for processing.

With reference to the first aspect, in a first possible implementation manner, before the dividing the stream computing application graph according to operator degrees and operator potentials of operators in the stream computing application graph and according to a division quantity for dividing the stream computing application graph, the method further includes determining a quantity of working nodes that are needed for processing the service corresponding to the stream computing application graph; and determining the division quantity according to the quantity of working nodes that are needed for processing the service.

With reference to the first aspect or the first possible implementation manner of the first aspect, in a second possible implementation manner, the dividing the stream computing application graph according to operator degrees and operator potentials of operators in the stream computing application graph and according to a division quantity for dividing the stream computing application graph includes performing first-time division on the stream computing application graph according to the operator degrees of the operators and the division quantity, to obtain first-time divided graphs; and performing second-time division on the first-time divided graphs according to the operator potentials, to obtain the divided sub-graphs.

With reference to the second possible implementation manner of the first aspect, in a third possible implementation manner, the performing first-time division on the stream computing application graph according to the operator degrees of the operators and the division quantity, to obtain first-time divided graphs includes determining center operators with a same quantity as the division quantity according to the operator degrees of the operators and the division quantity, where an operator degree of the center operator is at least greater than an operator degree of an operator connected to the center operator; traversing other operators except the center operators layer by layer using each center operator as a traversal starting point, until another center operator except the center operator or a swing operator is traversed, where the swing operator is an operator that is traversed simultaneously during traversal using two adjacent center operators as starting points; and allocating, to the first-time divided graphs, operators that are traversed starting from the center operator and before the another center operator or the swing operator is traversed.

With reference to the third possible implementation manner of the first aspect, in a fourth possible implementation manner, the determining center operators with a same quantity as the division quantity according to the operator degrees of the operators and the division quantity includes determining core operators and ordinary operators in the stream computing application graph according to the operator degrees of the operators, where an operator degree of the core operator is higher than an operator degree of an operator connected to the core operator, and the ordinary operators are operators in the stream computing application graph except the core operators; and according to the division quantity, determining, from the core operators, the center operators with a same quantity as the division quantity, or determining, from a combination of the core operators and the ordinary operators, the center operators with a same quantity as the division quantity.

With reference to the fourth possible implementation manner of the first aspect, in a fifth possible implementation manner, the determining, from the core operators, the center operators with a same quantity as the division quantity includes, when a quantity of the core operators is not less than the quantity of the center operators, selecting core operators, with the division quantity, having largest operator degrees as the center operators.

With reference to the fourth possible implementation manner of the first aspect, in a sixth possible implementation manner, the determining, from a combination of the core operators and the ordinary operators, the center operators with a same quantity as the division quantity includes, when a quantity of the core operators is less than the quantity of the center operators, selecting ordinary operators having largest operator degrees as remaining center operators that cannot be provided by the core operators adequately.

With reference to any one of the third to the sixth possible implementation manners of the first aspect, in a seventh possible implementation manner, the performing second-time division on the first-time divided graphs according to the operator potentials, to obtain the divided sub-graphs includes determining a graph partition potential of the first-time divided graph, where the graph partition potential is a cumulative sum of operator potentials of operators in the first-time divided graph; and determining, according to an operator potential of a swing operator between adjacent first-time divided graphs and graph partition potentials of the adjacent first-time divided graphs, a first-time divided graph to which the swing operator should be allocated, to obtain the divided sub-graphs.

With reference to the first aspect, or any one of the first to the seventh possible implementation manners of the first aspect, in an eighth possible implementation manner, the method further includes calculating graph partition load, where the graph partition load is a sum of load of operators in the divided sub-graph; calculating a load error value according to the graph partition load; and when the load error value is greater than a preset first check threshold, adjusting the swing operator from the divided sub-graph to a divided sub-graph having a smallest load error value, to obtain adjusted divided sub-graphs, where the scheduling a sub-service corresponding to an operator included in each divided sub-graph to a working node corresponding to the divided sub-graph for processing includes scheduling a sub-service corresponding to an operator included in each adjusted divided sub-graph to a working node corresponding to the adjusted divided sub-graph for processing.

With reference to the first aspect, or any one of the first to the seventh possible implementation manners of the first aspect, in a ninth possible implementation manner, the method further includes calculating graph partition network input traffic, output traffic, indegree, and outdegree, where the graph partition network input traffic is input traffic of operators that are in the divided sub-graph and that receive data streams across a physical node, the graph partition network output traffic is output traffic of operators that are in the divided sub-graph and that send data streams across a physical node, the graph partition network indegree is a quantity of data streams received by operators that are in the divided sub-graph and that receive data streams across a physical node, and the graph partition network outdegree is a quantity of data streams sent by operators that are in the divided sub-graph and that send data streams across a physical node; calculating a traffic error value according to the graph partition network input traffic, output traffic, indegree, and outdegree; and when the traffic error value is greater than a preset second check threshold, adjusting the swing operator from the divided sub-graph to a divided sub-graph having a smallest traffic error value, to obtain adjusted divided sub-graphs, where the scheduling a sub-service corresponding to an operator included in each divided sub-graph to a working node corresponding to the divided sub-graph for processing includes scheduling a sub-service corresponding to an operator included in each adjusted divided sub-graph to a working node corresponding to the adjusted divided sub-graph for processing.

A second aspect of the present disclosure provides a service scheduling apparatus, applied to a stream computing system, where the stream computing system is configured to schedule and process a service, the stream computing system includes a master control node and multiple working nodes, and the master control node is configured to schedule sub-services included in the service to the multiple working nodes for processing; and the apparatus includes an acquiring unit configured to acquire a stream computing application graph of the service, where the stream computing application graph is a logical relationship graph that is created in advance for the service and that includes operators and moving directions of data streams between the operators, and the operator in the stream computing application graph carries computational logic used for processing a sub-service that is in the service and that is corresponding to the operator; a dividing unit configured to divide the stream computing application graph according to operator degrees and operator potentials of the operators in the stream computing application graph acquired by the acquiring unit, and according to a division quantity for dividing the stream computing application graph, to obtain divided sub-graphs with the division quantity, where the operator degree is a cumulative sum of traffic weights of input-and-output traffic of the operator, and the operator potential is a load degree of the operator in the stream computing application graph; and a scheduling unit configured to schedule a sub-service corresponding to an operator included in each divided sub-graph obtained by means of division by the dividing unit, to a working node corresponding to the divided sub-graph for processing.

With reference to the second aspect, in a first possible implementation manner, the apparatus further includes a determining unit configured to, before the dividing unit divides the stream computing application graph, determine a quantity of working nodes that are needed for processing the service corresponding to the stream computing application graph; and determine the division quantity according to the quantity of working nodes that are needed for processing the service.

With reference to the second aspect or the first possible implementation manner of the second aspect, in a second possible implementation manner, the dividing unit includes a first dividing subunit configured to perform first-time division on the stream computing application graph according to the operator degrees of the operators and the division quantity, to obtain first-time divided graphs; and a second dividing subunit configured to perform, according to the operator potentials, second-time division on the first-time divided graphs obtained by means of division by the first dividing subunit, to obtain the divided sub-graphs.

With reference to the second possible implementation manner of the second aspect, in a third possible implementation manner, the first dividing subunit includes a determining subunit configured to determine center operators with a same quantity as the division quantity according to the operator degrees of the operators and the division quantity, where an operator degree of the center operator is at least greater than an operator degree of an operator connected to the center operator; a traversing subunit configured to traverse other operators except the center operators layer by layer using each center operator determined by the determining subunit as a traversal starting point, until another center operator except the center operator or a swing operator is traversed, where the swing operator is an operator that is traversed simultaneously during traversal using two adjacent center operators as starting points; and an allocating subunit configured to allocate, to the first-time divided graphs, operators that are traversed starting from the center operator and before the another center operator or the swing operator is traversed by the traversing subunit.

With reference to the third possible implementation manner of the second aspect, in a fourth possible implementation manner, the determining subunit is configured to determine core operators and ordinary operators in the stream computing application graph according to the operator degrees of the operators, where an operator degree of the core operator is higher than an operator degree of an operator connected to the core operator, and the ordinary operators are operators in the stream computing application graph except the core operators; and according to the division quantity, determine, from the core operators, the center operators with a same quantity as the division quantity, or determine, from a combination of the core operators and the ordinary operators, the center operators with a same quantity as the division quantity.

With reference to the fourth possible implementation manner of the second aspect, in a fifth possible implementation manner, the determining subunit is configured to, when a quantity of the core operators is not less than the quantity of the center operators, select core operators, with the division quantity, having largest operator degrees as the center operators.

With reference to the fourth possible implementation manner of the second aspect, in a sixth possible implementation manner, the determining subunit is configured to, when a quantity of the core operators is less than the quantity of the center operators, select ordinary operators having largest operator degrees as remaining center operators that cannot be provided by the core operators adequately.

With reference to any one of the third to the sixth possible implementation manners of the second aspect, in a seventh possible implementation manner, the second dividing subunit is configured to determine a graph partition potential of the first-time divided graph, where the graph partition potential is a cumulative sum of operator potentials of operators in the first-time divided graph; and determine, according to an operator potential of a swing operator between adjacent first-time divided graphs and graph partition potentials of the adjacent first-time divided graphs, a first-time divided graph to which the swing operator should be allocated, to obtain the divided sub-graphs.

With reference to the second aspect, or any one of the first to the seventh possible implementation manners of the second aspect, in an eighth possible implementation manner, the apparatus further includes a first calculating unit and a first adjusting unit, where the first calculating unit is configured to calculate graph partition load, where the graph partition load is a sum of load of operators in the divided sub-graph, and calculate a load error value according to the graph partition load; and the first adjusting unit is configured to, when the load error value calculated by the first calculating unit is greater than a preset first check threshold, adjust the swing operator from the divided sub-graph to a divided sub-graph having a smallest load error value, to obtain adjusted divided sub-graphs, where the scheduling unit is configured to schedule a sub-service corresponding to an operator included in each divided sub-graph adjusted by the first adjusting unit, to a working node corresponding to the adjusted divided sub-graph for processing.

With reference to the second aspect, or any one of the first to the seventh possible implementation manners of the second aspect, in a ninth possible implementation manner, the apparatus further includes a second calculating unit and a second adjusting unit, where the second calculating unit is configured to calculate graph partition network input traffic, output traffic, indegree, and outdegree, where the graph partition network input traffic is input traffic of operators that are in the divided sub-graph and that receive data streams across a physical node, the graph partition network output traffic is output traffic of operators that are in the divided sub-graph and that send data streams across a physical node, the graph partition network indegree is a quantity of data streams received by operators that are in the divided sub-graph and that receive data streams across a physical node, and the graph partition network outdegree is a quantity of data streams sent by operators that are in the divided sub-graph and that send data streams across a physical node; and calculate a traffic error value according to the graph partition network input traffic, output traffic, indegree, and outdegree; and the second adjusting unit is configured to, when the traffic error value calculated by the second calculating unit is greater than a preset second check threshold, adjust the swing operator from the divided sub-graph to a divided sub-graph having a smallest traffic error value, to obtain adjusted divided sub-graphs, where the scheduling unit is configured to schedule a sub-service corresponding to an operator included in each divided sub-graph adjusted by the second adjusting unit, to a working node corresponding to the adjusted divided sub-graph for processing.

A third aspect of the present disclosure provides a stream computing system, where the stream computing system is configured to schedule and process a service, the stream computing system includes a master control node and multiple working nodes, and the master control node is configured to schedule sub-services included in the service to the multiple working nodes for processing, where the master control node is configured to acquire a stream computing application graph of the service, where the stream computing application graph is a logical relationship graph that is created in advance for the service and that includes operators and moving directions of data streams between the operators, and the operator in the stream computing application graph carries computational logic used for processing a sub-service that is in the service and that is corresponding to the operator; divide the stream computing application graph according to operator degrees and operator potentials of the operators in the stream computing application graph and according to a division quantity for dividing the stream computing application graph, to obtain divided sub-graphs with the division quantity, where the operator degree is a cumulative sum of traffic weights of input-and-output traffic of the operator, and the operator potential is a load degree of the operator in the stream computing application graph; and schedule a sub-service corresponding to an operator included in each divided sub-graph to a working node corresponding to the divided sub-graph for processing.

In the service scheduling method provided in the embodiments of the present disclosure, a stream computing application graph is divided according to operator degrees and operator potentials of operators in the stream computing application graph and according to a division quantity for dividing the stream computing application graph, to obtain divided sub-graphs; a sub-service corresponding to an operator included in each divided sub-graph is scheduled to a working node corresponding to the divided sub-graph for processing. In the embodiments of the present disclosure, balanced graph division is performed by considering three factors involved in a scheduling process. Because an operator degree of an operator is considered during division, a network transmission overhead as small as possible can be obtained. Furthermore, a node potential is also considered, and therefore a node load ratio as optimal as possible can be obtained. Compared with the prior art in which unbalanced use of resources occurs when a service is deployed to a stream platform for running, the method provided in the embodiments of the present disclosure can enable the service to use physical resources and network resources in a balanced manner, thereby improving utilization of the physical resources and network resources.

BRIEF DESCRIPTION OF DRAWINGS

To describe the technical solutions of the embodiments of the present disclosure more clearly, the following briefly introduces the accompanying drawings required for describing the embodiments. The accompanying drawings in the following description show only some embodiments of the present disclosure, and a person of ordinary skill in the art may still derive other drawings from these accompanying drawings without creative efforts.

DESCRIPTION OF EMBODIMENTS

Embodiments of the present disclosure provide a service scheduling method, which can distribute services to working nodes in a balanced manner, so as to use physical resources and network resources in a balanced manner, thereby improving utilization of the physical resources and network resources. The embodiments of the present disclosure further provide a corresponding apparatus and system. Detailed descriptions are given below separately.

To make a person skilled in the art to understand the solutions of the present disclosure better, the following clearly describes the technical solutions in the embodiments of the present disclosure with reference to the accompanying drawings in the embodiments of the present disclosure. The described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

A stream computing system in the embodiments of the present disclosure includes a master control node and a working node. During cluster deployment, there may be one or more master control nodes and working nodes, and the master control node may be a physical node separate from the working node. During standalone deployment, both the master control node and the working node may be master control logic units deployed on a same physical node. The stream computing system is configured to schedule and process a service. A specific process is that the master control node is responsible for scheduling the service to the working node for processing. One physical node may include one working node, or may include multiple working nodes. A quantity of working nodes included in one physical node depends on physical hardware resources of the physical node. One working node may be understood as one physical hardware resource. Working nodes that belong to a same physical node communicate with each other by means of process communications, and working nodes that belong to different physical nodes communicate with each other by means of network communications. The stream computing system can schedule the service to the working nodes for processing. For a service that runs on the stream computing system, a stream computing application graph may be created in advance. The stream computing application graph is a logical relationship graph that is created in advance for the service and that includes operators and moving directions of data streams between the operators, where an operator in the stream computing application graph carries computational logic used for processing a sub-service that is in the service and that is corresponding to the operator. The physical node in the embodiments of the present disclosure refers to a physical device.

Figure 1:
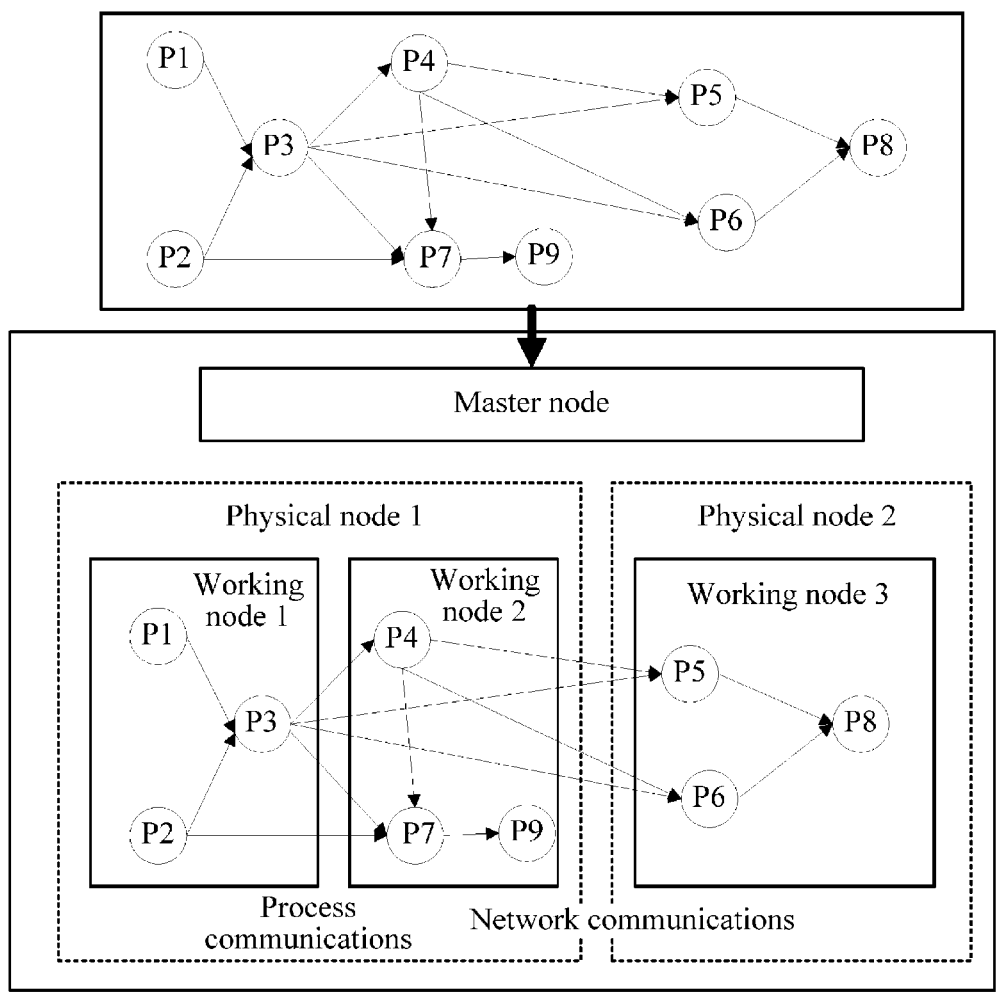
FIG. 1 is a schematic diagram of an embodiment of a service scheduling method according to an embodiment of the present disclosure.

As shown in FIG. 1, the stream computing system includes a master control node, a working node 1, a working node 2, and a working node 3. The working node 1 and the working node 2 belong to a physical node 1, and the working node 3 belongs to a physical node 2.

The master control node schedules a stream computing application graph shown in FIG. 1 to the three working nodes, namely the working node 1, the working node 2, and the working node 3, for service processing. The stream computing application graph shown in FIG. 1 is a logical relationship graph that includes nine operators from P1 to P9 and moving directions of data streams between the nine operators.

Operators P1, P2, and P3 that are scheduled to the working node 1 communicate, in a process manner, with operators P4, P7, and P9 that are scheduled to the working node 2. P1, P2, and P3, and P4, P7, and P9 communicate, via a network, with operators P5, P6, and P8 that are scheduled to the working node 3.

The stream computing application graph in this embodiment of the present disclosure includes a directed acyclic graph (DAG), a tree diagram, or a cyclic graph.

In a process in which service scheduling is performed, the master control node acquires the stream computing application graph of a service. The stream computing application graph is a logical relationship graph that is created in advance for the service and that includes operators and moving directions of data streams between the operators, where an operator in the stream computing application graph carries computational logic used for processing a sub-service that is in the service and that is corresponding to the operator.

The stream computing application graph is a data stream that is created in advance by a user or a developer according to the service. The stream computing application graph is used for showing a logical model of a stream application. The stream computing application graph may be understood with reference to FIG. 2. A stream computing application graph shown in FIG. 2 includes 13 operators from n1 to n13, and 13 data streams from s1 to s13. Moving directions of the data streams are marked clearly in FIG. 2. For example, data streams s1 are data streams from an operator n1 to an operator n2 and from the operator n1 to an operator n3, which indicates that two data streams s1 are generated after the operator n1 performs logic processing on a data stream, and enter the operator n2 and the operator n3 for logic processing separately. Meanings indicated by moving directions of other data streams are the same as the meaning indicated by the moving directions of the data streams s1, and a difference only lies in that the data streams pass through different operators, which are not described one by one herein.

The stream computing application graph is divided according to operator degrees and operator potentials of the operators in the stream computing application graph and according to a division quantity for dividing the stream computing application graph, to obtain divided sub-graphs with the division quantity, where the operator degree is a cumulative sum of traffic weights of input-and-output traffic of the operator, and the operator potential is a load degree of the operator in the stream computing application graph.

The operator in this embodiment of the present disclosure is a logic processing unit. The operator has two kinds of description parameters, which are an operator load degree and operator input-and-output traffic. The operator load degree may reflect a quantity of resources consumed when a service runs according to logic of the operator after the service is deployed to a working node of a physical node. A higher load degree of an operator indicates a larger quantity of resources consumed during running of a service. The operator input-and-output traffic refers to input traffic and output traffic of an operator. For example, input traffic of the operator n2 is s1, and output traffic of the operator n2 is s2.

An operator load degree of a system operator in the operator load degrees is given by a developer during development, and an operator load degree of a user-defined operator is given by a user with reference to the operator load degree of the system operator.

The operator load degree is related to an operator type, and therefore the operator load degree may be given with reference to the operator type. The traffic weight is related to a stream distribution policy, and therefore the traffic weight may be given with reference to the stream distribution policy. For example, with reference to the operators and the data streams in FIG. 2, the load degrees of the operators and the traffic weights of the data streams may be understood with reference to Table 1 and Table 2. Table 1 is an operator load degree table, and Table 2 is a table showing traffic weights of data streams.

TABLE 1

| Operator load degree table | | |
|---|---|---|
| Operators | Operator types | Operator load degrees |
| n1 | TCP Adp Source | 2 |
| n2 | split | 1 |
| n3 | User defined | 2 |
| n4 | User defined | 6 |
| n5 | filter | 2 |
| n6 | parser | 4 |
| n7 | join | 4 |
| n8 | aggregate | 5 |
| n9 | User defined | 3 |
| n10 | parser | 4 |
| n11 | TCP Adp Sink | 1 |
| n12 | csv Adp Sink | 2 |
| n13 | csv Adp Sink | 2 |

It can be seen from Table 1 that the operators include public operators and user-defined operators. User defined operators of which the operator types are user defined types are the user-defined operators, and other operators of which the operator types are Transmission Control Protocol Application Distribution Protocol Source (TCP Adp Source), split, filter, parser, join, aggregate, TCP Adp Sink, and csv Adp Sink are the public operators. An operator load degree of the public operator of each specific type is given by a developer during developing a stream computing application graph. Operator load degrees of the operators of the user defined type are given by a user with reference to the load degrees of the public operators.

Referring to Table 2, stream distribution policies in Table 2 are given by a developer during developing a stream computing application graph, and each stream distribution policy has a corresponding traffic weight. The traffic weight is a digital description value of traffic.

TABLE 2

Table showing traffic weights of data streams

| Data streams | Distribution policies | Traffic weights |
| --- | --- | --- |
| s1 | random | 1 |
| s2 | all | 3 |
| s3 | all | 3 |
| s4 | direct | 1 |
| s5 | random | 1 |
| s6 | field hash | 2 |
| s7 | field hash | 2 |
| s8 | field hash | 2 |
| s9 | random | 1 |
| s10 | random | 1 |
| s11 | field hash | 2 |
| s12 | field hash | 2 |
| s13 | field hash | 2 |

With reference to the operator load degrees and the traffic weights in Table 1 and Table 2, two conceptions, namely an operator degree and an operator potential, are defined for the stream computing application graph. The operator degree is a cumulative sum of traffic weights of input-and-output traffic of the operator. For example, for the operator n2, input traffic and output traffic are s1 and s2 respectively, a traffic weight of s1 is 1, and a traffic weight of s2 is 3, and therefore, an operator degree of the operator n2 is 4. The operator potential is a load degree of an operator in the stream computing application graph. For example, an operator load degree of the operator n2 is 1, and therefore an operator potential of the operator n2 is 1.

The stream distribution policies include random distribution random, all distribution all, direct distribution direct, and field hash distribution field hash.

Before the dividing the stream computing application graph according to operator degrees and operator potentials of operators in the stream computing application graph and according to a division quantity for dividing the stream computing application graph, the method may further include determining a quantity of working nodes that are needed for processing the service corresponding to the stream computing application graph; and determining the division quantity according to the quantity of working nodes that are needed for processing the service.

Figure 2:
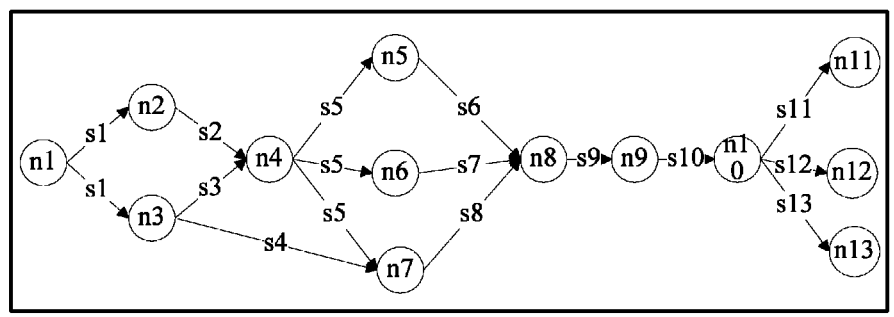
FIG. 2 is a schematic diagram of another embodiment of a service scheduling method according to an embodiment of the present disclosure.

After both the operator degree and the operator degree are determined, it is required to further determine, with reference to the stream computing application graph in FIG. 2, a quantity of divided sub-graphs into which the stream computing application graph is divided. During determining of a division quantity, a working node needed by the service corresponding to the stream computing application graph may be considered, that is, a physical resource needed by the service. If only one working node is needed, division is not required, and it may be understood that the division quantity is 1 in this embodiment of the present disclosure. If multiple working nodes are needed, the division quantity may be determined with reference to working nodes in a stream computing system; for example, 3 working nodes exist in the stream computing system and are located on two physical nodes, a resource ratio of the two physical nodes is 2:1 (computing resources such as a memory and a CPU are all abstractly digitized), and in this case, the stream computing application graph is divided into 3 divided sub-graphs.

After the division quantity is determined, the stream computing application graph is divided according to the division quantity and the operator degrees and the operator potentials of the operators in the stream computing application graph, and the stream computing application graph is divided into three divided sub-graphs; a specific dividing process may include performing first-time division on the stream computing application graph according to the operator degrees of the operators and the division quantity, to obtain first-time divided graphs; and performing second-time division on the first-time divided graphs according to the operator potentials, to obtain the divided sub-graphs.

A specific process of performing first-time division on the stream computing application graph according to the operator degrees of the operators and the division quantity, to obtain first-time divided graphs may be determining center operators with a same quantity as the division quantity according to the operator degrees of the operators and the division quantity, where an operator degree of the center operator is at least greater than an operator degree of an operator connected to the center operator; traversing other operators except the center operators layer by layer using each center operator as a traversal starting point, until another center operator except the center operator or a swing operator is traversed, where the swing operator is an operator that is traversed simultaneously during traversal using two adjacent center operators as starting points; and allocating, to the first-time divided graphs, operators that are traversed starting from the center operator and before the another center operator or the swing operator is traversed.

The determining center operators with a same quantity as the division quantity according to the operator degrees of the operators and the division quantity may include determining core operators and ordinary operators in the stream computing application graph according to the operator degrees of the operators, where an operator degree of the core operator is higher than an operator degree of an operator connected to the core operator, and the ordinary operators are operators in the stream computing application graph except the core operators; and according to the division quantity, determining, from the core operators, the center operators with a same quantity as the division quantity, or determining, from a combination of the core operators and the ordinary operators, the center operators with a same quantity as the division quantity. The determining, from the core operators, the center operators with a same quantity as the division quantity may include, when a quantity of the core operators is not less than the quantity of the center operators, selecting core operators, with the division quantity, having largest operator degrees as the center operators.

The determining, from the core operators, the center operators with a same quantity as the division quantity may include, when a quantity of the core operators is less than the quantity of the center operators, selecting ordinary operators having largest operator degrees as remaining center operators that cannot be provided by the core operators adequately.

With reference to FIG. 2, every operator in FIG. 2 is traversed to search for core operators and ordinary operators, where an operator degree of the core operator is higher than an operator degree of an operator connected to the core operator, and operators in the stream computing application graph except the core operators are the ordinary operators.

Calculation results of operator degrees of the thirteen operators in FIG. 2 may be understood with reference to Table 3.

TABLE 3

Operator degree table

| Operators | Operator degrees |
|---|---|
| n1 | 2 |
| n2 | 4 |
| n3 | 5 |
| n4 | 9 |
| n5 | 3 |
| n6 | 3 |
| n7 | 3 |
| n8 | 7 |
| n9 | 2 |
| n10 | 7 |
| n11 | 2 |
| n12 | 2 |
| n13 | 2 |

With reference to the operator degrees of the operators in Table 3, it may be determined that the core operators in FIG. 2 are n4, n8 and n10, and other operators are all the ordinary operators.

The division quantity in this embodiment is three, and then n4, n8, and n10 may all be used as center operators. When a quantity of core operators is greater than 3, 3 core operators having largest operator degrees may be selected from the core operators as center operators. When the quantity of core operators is less than three, for example, when there are only two core operators, the two core operators are determined as center operators, and for the lacking one, an ordinary operator having a largest operator degree is selected from the ordinary operators as the third center operator.

In this embodiment of the present disclosure, after the three center operators are determined, for example, after the center operators n4, n8, and n10 are determined, traversal is performed starting from n4, n8, and n10 separately layer by layer. Operators that are traversed from n4 and connected to n4 are n2, n3, n5, n6, and n7; operators that are traversed from n8 and connected to n8 are n5, n6, n7, and n9; and operators that are traversed from n10 and connected to n10 are n9, n11, n12, and n13. After n2 and n3 are traversed from n4, n2, and n3 are used as new expansion starting points to traverse n1. n5, n6, and n7 are operators at positions at which n4 and n8 meet when undergoing expansion, and then n5, n6, and n7 are swing operators; n9 is an operator at a position at which n8 and n10 meet when undergoing expansion separately, and then n9 is a swing operator. According to a connection relationship shown in FIG. 2, n10 may also be referred as a bridge operator, and n1, n11, n12, and n13 may also be referred as boundary operators.

Figure 3:
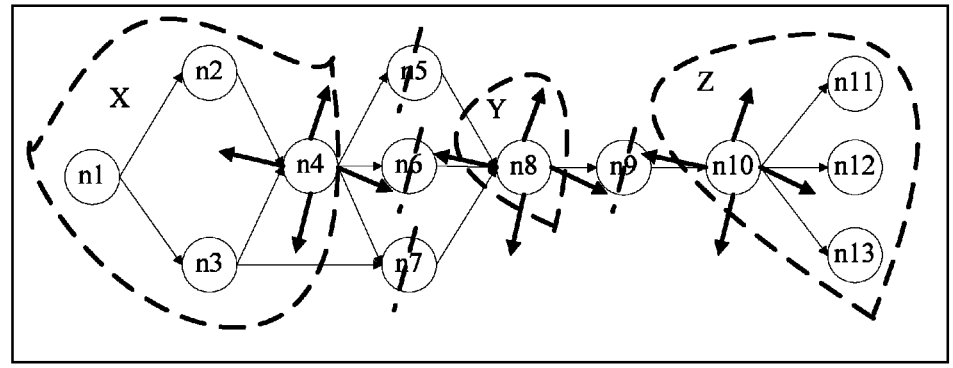
FIG. 3 is a schematic diagram of another embodiment of a service scheduling method according to an embodiment of the present disclosure.

In this way, after the first-time division, the first-time divided graphs may be determined, and reference may be made to FIG. 3 for understanding. In the three first-time divided graphs that are obtained after the first-time division, a first-time divided graph using n4 as the center operator includes operators n1, n2, n3, and n4, a first-time divided graph using n8 as the center operator includes the operator n8, and a first-time divided graph using n10 as the center operator includes operators n10, n11, n12, and n13.

Figure 4:
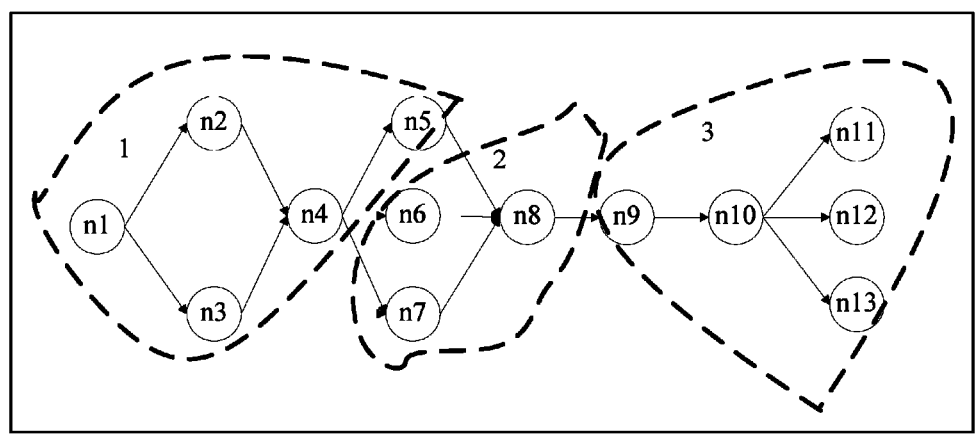
FIG. 4 is a schematic diagram of another embodiment of a service scheduling method according to an embodiment of the present disclosure.

After the first-time divided graphs shown in FIG. 3 are determined after the first-time division, second-time division is performed on the first-time divided graphs according to the operator potentials to obtain the divided sub-graphs, as shown in FIG. 4.

After the first-time divided graphs are determined, the performing second-time division on the first-time divided graphs according to the operator potentials, to obtain the divided sub-graphs may include determining a graph partition potential of the first-time divided graph, where the graph partition potential is a cumulative sum of operator potentials of operators in the first-time divided graph; and determining, according to an operator potential of a swing operator between adjacent first-time divided graphs and graph partition potentials of the adjacent first-time divided graphs, a first-time divided graph to which the swing operator should be allocated, to obtain the divided sub-graphs.

In this embodiment of the present disclosure, the performing second-time division on the first divided graphs according to the operator potentials, actually, the swing operators n5, n6, n7, and n9 that are determined when the first-time division is performed are allocated to corresponding first-time divided graphs, to obtain final divided sub-graphs.

Referring to Table 2 and the definition of the operator potential, operator potentials of the thirteen operators in FIG. 2 may be obtained. Operator potentials shown in FIG. 2 may be understood with reference to Table 4.

TABLE 4

Operator degree and potential

| Operators | Operator potentials |
|---|---|
| n1 | 2 |
| n2 | 1 |
| n3 | 2 |
| n4 | 6 |
| n5 | 2 |
| n6 | 4 |
| n7 | 4 |
| n8 | 5 |
| n9 | 3 |
| n10 | 4 |
| n11 | 1 |
| n12 | 2 |
| n13 | 2 |

That which first-time divided graph a swing operator is specially allocated to may be understood according to the following process:

Graph partition potentials of the three first-time divided graphs are calculated first. A graph partition potential is a cumulative sum of operator potentials of operators included in a first-time divided graph. For example, a first-time divided graph including n4 is set as X, a first-time divided graph including n8 is set as Y, and a first-time divided graph including n10 is set as Z; then, a graph partition potential of X is 11, a graph partition potential of Y is 5, and a graph partition potential of Z is 9. A difference between graph partition potentials of the section X and the section Y is relatively large. Therefore, operators having larger operator potentials in the swing operators n5, n6, and n7 are allocated to the section Y first, and then the graph partition potential of the section Y is calculated constantly. After the operators n6 and n7 are allocated to the section Y, the graph partition potential of the section Y reaches 13, which is greater than the graph partition potential of the section X by 2, and therefore, the operator n5 may be allocated to the section X. In this way, the graph partition potential of the section X after the allocating is performed is also 13, same as that of the section Y, and the graph partition potential of the section Z is 9. The graph partition potential of the section Y after the allocating is performed has reached 13, and therefore, n9 is directly allocated to the section Z, and the graph partition potential of the section Z after the allocating is performed is 12. After the second-time division, the section X after the division is marked with a graph partition 1, the section Y after the division is marked with a graph partition 2, and the section Z after the division is marked with a graph partition 3.

During partition allocating of the swing operators, allocating is directly performed according to a difference between graph partition potentials of adjacent partitions. When the difference between graph partition potentials of the adjacent partitions is relatively small, and no matter to which partition an operator potential of a swing operator is added, a graph partition potential of the partition is caused to be higher than a graph partition potential of the other partition, the allocating of the swing operator may be determined using a ratio approaching 1 principle.

The ratio approaching 1 principle is described below using an example: (1) It is assumed that there are two graph partitions A and B, and graph partition potentials are 4 and 5 respectively; (2) an operator a is a swing operator between the two partitions, and an operator potential is 2; (3) if the operator a is allocated to the section A, a ratio of the two graph partition potentials is 6:5; if the operator a is allocated to the section B, a ratio of the two graph partition potentials is 4:7; and (4) it is determined, according to that $|6/5-1|<|4/7-1|$, that the operator a is allocated to the section A.

The graph partition potentials of the three divided sub-graphs after the second-time division are 13, 13, and 12 respectively, which may be understood with reference to Table 5.

TABLE 5

Graph partitions and graph partition potentials

| Graph partitions | Graph partition potentials |
| --- | --- |
| 1 | 13 |
| 2 | 13 |
| 3 | 12 |

Figure 5:
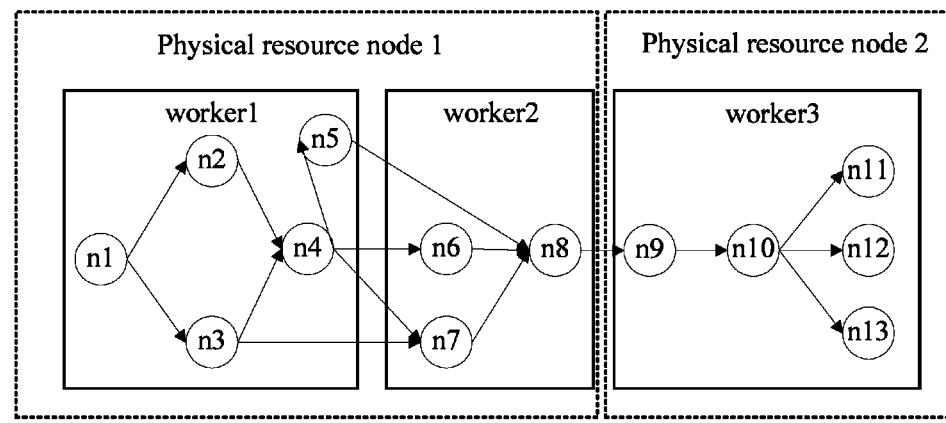
FIG. 5 is a schematic diagram of another embodiment of a service scheduling method according to an embodiment of the present disclosure.

After the three divided sub-graphs are obtained through division, because two physical nodes are determined before the division and a physical resource ratio thereof is 2:1, services corresponding to the operators included in the three divided sub-graphs may be scheduled to physical resources corresponding to the divided sub-graphs for running. For example, referring to FIG. 5, n1, n2, n3, n4, and n5 are scheduled to a worker1 on a first physical node for running, n6, n7, and n8 are scheduled to a worker2 on the first physical node for running, and n9, n10, n11, n12, and n13 are scheduled to a worker3 on a second physical node for running. The physical nodes communicate with each other via a network.

After a sub-service corresponding to each operator in the divided sub-graph is scheduled to a working node, the following steps may further include calculating graph partition load, where the graph partition load is a sum of load of operators in the divided sub-graph; calculating a load error value according to the graph partition load; when the load error value is greater than a preset first check threshold, adjusting the swing operator from the divided sub-graph to a divided sub-graph having a smallest load error value, to obtain adjusted divided sub-graphs; and scheduling a sub-service corresponding to an operator included in each adjusted divided sub-graph to a working node corresponding to the adjusted divided sub-graph for processing. Alternatively, the following steps may include calculating graph partition network input traffic, output traffic, indegree, and outdegree, where the graph partition network input traffic is input traffic of operators that are in the divided sub-graph and that receive data streams across a physical node, the graph partition network output traffic is output traffic of operators that are in the divided sub-graph and that send data streams across a physical node, the graph partition network indegree is a quantity of data streams received by operators that are in the divided sub-graph and that receive data streams across a physical node, and the graph partition network outdegree is a quantity of data streams sent by operators that are in the divided sub-graph and that send data streams across a physical node; calculating a traffic error value according to the graph partition network input traffic, output traffic, indegree, and outdegree; and when the traffic error value is greater than a preset second check threshold, adjusting the swing operator from the divided sub-graph to a divided sub-graph having a smallest traffic error value, to obtain adjusted divided sub-graphs.

A sub-service corresponding to an operator included in each adjusted divided sub-graph is scheduled to a working node corresponding to the adjusted divided sub-graph for processing. After each operator is scheduled to a corresponding working node, running information of each operator further needs to be monitored, and then the swing operator in each graph partition is finely adjusted according to a monitoring result, so that physical resources or network resources further achieve a better balanced state. According to a record of operator monitoring information, an operator running information monitoring table may be created, to record resource load consumed during running of the operators, and input traffic and output traffic generated during data stream transmission; and then graph partition load and graph partition traffic are calculated according to information recorded in the running information monitoring table. The graph partition load is a sum of load of operators in the divided sub-graph, and the graph partition traffic is a sum of input traffic and a sum of output traffic of operators in the divided sub-graph.

The operator running information monitoring table may be understood with reference to Table 6:

TABLE 6

Operator running information monitoring table

| Operators | Load | Input traffic | Output traffic |
| --- | --- | --- | --- |
| n1 | 2 | 0 | 3 |
| n2 | 1 | 2.3 | 2.3 |
| n3 | 2 | 1.7 | 1.6 |
| n4 | 9 | 3 | 4.2 |
| n5 | 2 | 2.8 | 1 |
| n6 | 4 | 1 | 1 |
| n7 | 4 | 1.9 | 1.9 |
| n8 | 5 | 3.9 | 1.5 |
| n9 | 3 | 1.5 | 4.5 |
| n10 | 4 | 4.5 | 4.5 |
| n11 | 1 | 1.5 | 0 |
| n12 | 2 | 1.5 | 0 |
| n13 | 2 | 1.5 | 0 |

A partition information table shown in Table 7 may be obtained according to Table 5 and Table 6. Graph partition network indegree, outdegree, input traffic, and output traffic in the partition information table shown in Table 7 are all obtained across a physical node, and therefore, graph partition network indegree, outdegree, input traffic and output traffic in the graph partition 1 are all 0. Both graph partition network indegree and input traffic in the graph partition 2 are 0, and because there is only one data stream from n8 to n9, outdegree is 1; and it can be seen from Table 6 that output traffic is 1.5. Graph partition network indegree in the graph partition 3 is 1, input traffic is 1.5, and both outdegree and output traffic are 0.

TABLE 7

Partition information table

| Graph partitions | Graph partition potentials | Graph partition load | Graph partition network indegree | Graph partition network input traffic | Graph partition network outdegree | Graph partition network output traffic | Physical nodes |
|---|---|---|---|---|---|---|---|
| 1 | 13 | 16 | 0 | 0 | 0 | 0 | 1 |
| 2 | 13 | 13 | 0 | 0 | 1 | 1.5 | 2 |
| 3 | 12 | 12 | 1 | 1.5 | 0 | 0 | 2 |

A load error value may be calculated according to a formula 1, and a traffic error may be calculated according to a formula 2.

The formula 1 is as follows: load error value=|graph partition load-graph partition potential)|/graph partition potential.

The formula 2 is as follows: traffic error value=|graph partition network output traffic-graph partition network outdegree)|/graph partition network outdegree; or, traffic error value=|graph partition network input traffic-graph partition network indegree)|/graph partition network indegree.

Figure 6:
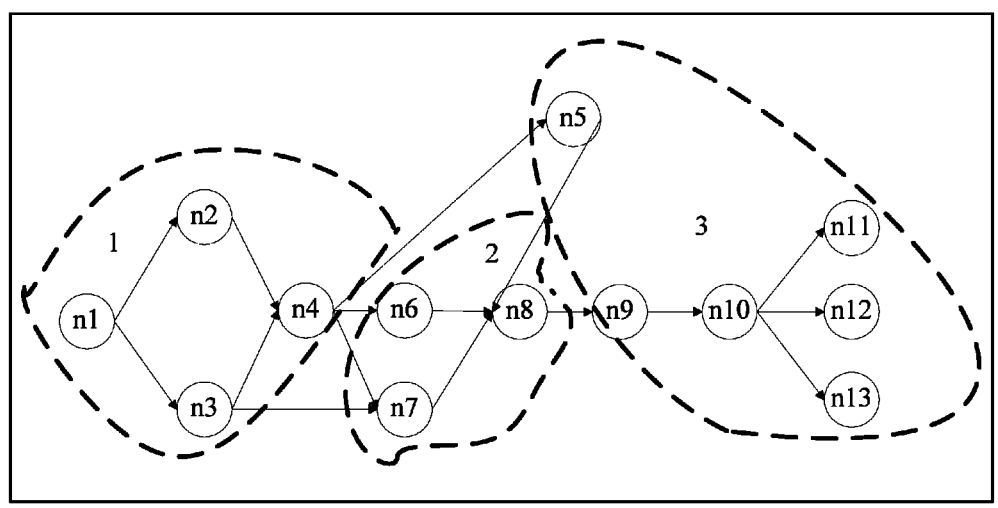
FIG. 6 is a schematic diagram of another embodiment of a service scheduling method according to an embodiment of the present disclosure.

During adjustment, it may be considered whether to mainly adjust load balance or mainly adjust network resource balance. If the load balance is focused on, it may be determined, according to a relationship between the load error value and a preset load threshold, how to adjust the swing operator. Assuming that the load threshold is 0.2, a load error value in the graph partition 1 is calculated according to Table 7 and the formula 1 as follows: load error value=|16−13|/13=0.230769>0.2, which indicates that load of the graph partition 1 is slightly heavy; because both load error values in the graph partition 2 and the graph partition 3 are 0, it may be considered to adjust the swing operator n5 from the graph partition 1 to the graph partition 2 or the graph partition 3. If it can be ensured that load error values of the three graph partitions are all less than 0.2 when the swing operator n5 is adjusted to the graph partition 3, the swing operator n5 is adjusted to the graph partition 3. The adjusted divided sub-graphs of the stream computing application graph may be understood with reference to FIG. 6.

In this embodiment of the present disclosure, before service scheduling is performed, an operator degree and an operator potential in a stream computing application graph are considered fully, then the stream computing application graph is divided according to the operator degree and the operator potential in the stream computing application graph, and a result after the division is scheduled to a physical node, so that a service can use physical resources and network resources in a balanced manner, thereby improving utilization of the physical resources and network resources.

Figure 7:
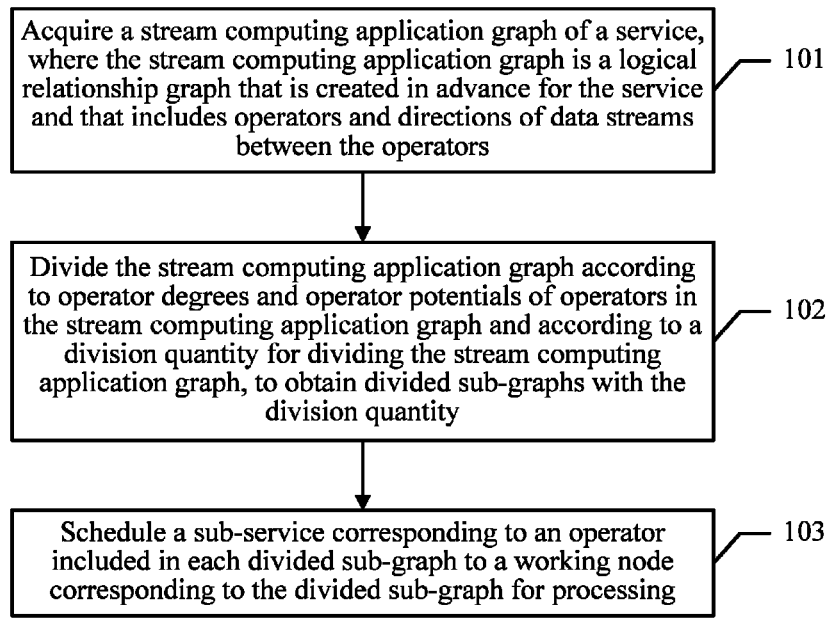
FIG. 7 is a schematic diagram of another embodiment of a service scheduling method according to an embodiment of the present disclosure.

Referring to FIG. 7, a service scheduling method according to an embodiment of the present disclosure includes as follows:

The service scheduling method provided in this embodiment of the present disclosure is applied to a stream computing system. The stream computing system is configured to schedule and process a service, the stream computing system includes a master control node and multiple working nodes, and the master control node is configured to schedule sub-services included in the service to the multiple working nodes for processing. The method includes:

101: Acquire a stream computing application graph of the service, where the stream computing application graph is a logical relationship graph that is created in advance for the service and that includes operators and moving directions of data streams between the operators, and the operator in the stream computing application graph carries computational logic used for processing a sub-service that is in the service and that is corresponding to the operator.

102: Divide the stream computing application graph according to operator degrees and operator potentials of the operators in the stream computing application graph and according to a division quantity for dividing the stream computing application graph, to obtain divided sub-graphs with the division quantity, where the operator degree is a cumulative sum of traffic weights of input-and-output traffic of the operator, and the operator potential is a load degree of the operator in the stream computing application graph.

103: Schedule a sub-service corresponding to an operator included in each divided sub-graph to a working node corresponding to the divided sub-graph for processing.

In the service scheduling method provided in this embodiment of the present disclosure, a stream computing application graph is divided according to operator degrees and operator potentials of operators in the stream computing application graph and according to a division quantity for dividing the stream computing application graph, to obtain divided sub-graphs with the division quantity; a sub-service corresponding to an operator included in each divided sub-graph is scheduled to a working node corresponding to the divided sub-graph for processing. In this embodiment of the present disclosure, a graph is divided in a balanced manner by considering three factors involved in a scheduling process. Because an operator degree of an operator is considered during division, a network transmission overhead as small as possible can be obtained. Furthermore, a node potential is also considered, and therefore a node load ratio as optimal as possible can be obtained. Compared with the prior art in which unbalanced use of resources occurs when a service is deployed to a stream platform for running, the method provided in this embodiment of the present disclosure can enable the service to use physical resources and network resources in a balanced manner, thereby improving utilization of the physical resources and network resources.

Optionally, based on the foregoing embodiment corresponding to FIG. 7, in an service scheduling method provided in an embodiment of the present disclosure, before the dividing the stream computing application graph according to operator degrees and operator potentials of operators in the stream computing application graph and according to a division quantity for dividing the stream computing application graph, the method may further include determining a quantity of working nodes that are needed for processing the service corresponding to the stream computing application graph; and determining the division quantity according to the quantity of working nodes that are needed for processing the service.

Optionally, based on the foregoing embodiment or an optional embodiment corresponding to FIG. 7, in the service scheduling method provided in this embodiment of the present disclosure, the dividing the stream computing application graph according to operator degrees and operator potentials of operators in the stream computing application graph and according to a division quantity for dividing the stream computing application graph may include performing first-time division on the stream computing application graph according to the operator degrees of the operators and the division quantity, to obtain first-time divided graphs; and performing second-time division on the first-time divided graphs according to the operator potentials, to obtain the divided sub-graphs.

Optionally, based on the foregoing optional embodiment corresponding to FIG. 7, in the service scheduling method provided in this embodiment of the present disclosure, the performing first-time division on the stream computing application graph according to the operator degrees of the operators and the division quantity, to obtain first-time divided graphs may include determining center operators with a same quantity as the division quantity according to the operator degrees of the operators and the division quantity, where an operator degree of the center operator is at least greater than an operator degree of an operator connected to the center operator; traversing other operators except the center operators layer by layer using each center operator as a traversal starting point, until another center operator except the center operator or a swing operator is traversed, where the swing operator is an operator that is traversed simultaneously during traversal using two adjacent center operators as starting points; and allocating, to the first-time divided graphs, operators that are traversed starting from the center operator and before the another center operator or the swing operator is traversed.

Optionally, based on the foregoing optional embodiment corresponding to FIG. 7, in the service scheduling method provided in this embodiment of the present disclosure, the determining center operators with a same quantity as the division quantity according to the operator degrees of the operators and the division quantity may include determining core operators and ordinary operators in the stream computing application graph according to the operator degrees of the operators, where an operator degree of the core operator is higher than an operator degree of an operator connected to the core operator, and the ordinary operators are operators in the stream computing application graph except the core operators; and according to the division quantity, determining, from the core operators, the center operators with a same quantity as the division quantity, or determining, from a combination of the core operators and the ordinary operators, the center operators with a same quantity as the division quantity.

Optionally, based on the foregoing optional embodiment corresponding to FIG. 7, in the service scheduling method provided in this embodiment of the present disclosure, the determining, from the core operators, the center operators with a same quantity as the division quantity may include, when a quantity of the core operators is not less than the quantity of the center operators, selecting core operators, with the division quantity, having largest operator degrees as the center operators.

Optionally, based on the foregoing optional embodiment corresponding to FIG. 7, in the service scheduling method provided in this embodiment of the present disclosure, the determining, from the core operators, the center operators with a same quantity as the division quantity may include, when a quantity of the core operators is less than the quantity of the center operators, selecting ordinary operators having largest operator degrees as remaining center operators that cannot be provided by the core operators adequately.

Optionally, based on the foregoing optional embodiment corresponding to FIG. 7, in the service scheduling method provided in this embodiment of the present disclosure, the performing second-time division on the first-time divided graphs according to the operator potentials, to obtain the divided sub-graphs may include determining a graph partition potential of the first-time divided graph, where the graph partition potential is a cumulative sum of operator potentials of operators in the first-time divided graph; and determining, according to an operator potential of a swing operator between adjacent first-time divided graphs and graph partition potentials of the adjacent first-time divided graphs, a first-time divided graph to which the swing operator should be allocated, to obtain the divided sub-graphs.

Optionally, based on the foregoing embodiment or an optional embodiment corresponding to FIG. 7, in the service scheduling method provided in this embodiment of the present disclosure, the method may further include calculating graph partition load, where the graph partition load is a sum of load of operators in the divided sub-graph; calculating a load error value according to the graph partition load; and when the load error value is greater than a preset first check threshold, adjusting the swing operator from the divided sub-graph to a divided sub-graph having a smallest load error value, to obtain adjusted divided sub-graphs, where the scheduling a sub-service corresponding to an operator included in each divided sub-graph to a working node corresponding to the divided sub-graph for processing may include scheduling a sub-service corresponding to an operator included in each adjusted divided sub-graph to a working node corresponding to the adjusted divided sub-graph for processing.

Optionally, based on the foregoing embodiment or an optional embodiment corresponding to FIG. 7, in the service scheduling method provided in this embodiment of the present disclosure, the method may further include calculating graph partition network input traffic, output traffic, indegree, and outdegree, where the graph partition network input traffic is input traffic of operators that are in the divided sub-graph and that receive data streams across a physical node, the graph partition network output traffic is output traffic of operators that are in the divided sub-graph and that send data streams across a physical node, the graph partition network indegree is a quantity of data streams received by operators that are in the divided sub-graph and that receive data streams across a physical node, and the graph partition network outdegree is a quantity of data streams sent by operators that are in the divided sub-graph and that send data streams across a physical node; calculating a traffic error value according to the graph partition network input traffic, output traffic, indegree, and outdegree; and when the traffic error value is greater than a preset second check threshold, adjusting the swing operator from the divided sub-graph to a divided sub-graph having a smallest traffic error value, to obtain adjusted divided sub-graphs, where the scheduling a sub-service corresponding to an operator included in each divided sub-graph to a working node corresponding to the divided sub-graph for processing may include scheduling a sub-service corresponding to an operator included in each adjusted divided sub-graph to a working node corresponding to the adjusted divided sub-graph for processing.

The process of the service scheduling method provided in this embodiment of the present disclosure may be understood with reference to descriptions from FIG. 1 to FIG. 6, which is not described herein again.

In this embodiment of the present disclosure, a graph is divided in a balanced manner by considering three factors involved in a scheduling process. Because an operator degree of an operator is considered during division, a network transmission overhead as small as possible can be obtained. Furthermore, a node potential is also considered, and therefore a node load ratio as optimal as possible can be obtained. Compared with the prior art in which unbalanced use of resources occurs when a service is deployed to a stream platform for running, the method provided in this embodiment of the present disclosure can enable the service to use physical resources and network resources in a balanced manner, thereby improving utilization of the physical resources and network resources.

Figure 8:
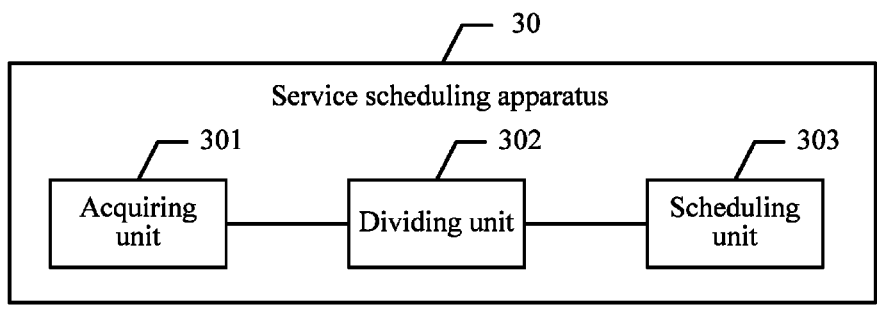
FIG. 8 is a schematic diagram of an embodiment of a service scheduling apparatus according to an embodiment of the present disclosure.

Referring to FIG. 8, based on the forgoing method embodiments, an embodiment of the present disclosure further provides a service scheduling apparatus 30, applied to a stream computing system. The stream computing system is configured to schedule and process a service, the stream computing system includes a master control node and multiple working nodes, and the master control node is configured to schedule sub-services included in the service to the multiple working nodes for processing. The apparatus includes an acquiring unit 301 configured to acquire a stream computing application graph of the service, where the stream computing application graph is a logical relationship graph that is created in advance for the service and that includes operators and moving directions of data streams between the operators, and the operator in the stream computing application graph carries computational logic used for processing a sub-service that is in the service and that is corresponding to the operator; a dividing unit 302 configured to divide the stream computing application graph according to operator degrees and operator potentials of the operators in the stream computing application graph acquired by the acquiring unit 301 and according to a division quantity for dividing the stream computing application graph, to obtain divided sub-graphs with the division quantity, where the operator degree is a cumulative sum of traffic weights of input-and-output traffic of the operator, and the operator potential is a load degree of the operator in the stream computing application graph; and a scheduling unit 303 configured to schedule a sub-service corresponding to an operator included in each divided sub-graph obtained by means of division by the dividing unit 302, to a working node corresponding to the divided sub-graph for processing.

Compared with the prior art in which unbalanced use of resources occurs when a service is deployed to a stream platform for running, the apparatus provided in this embodiment of the present disclosure can enable the service to use physical resources and network resources in a balanced manner, thereby improving utilization of the physical resources and network resources.

Figure 9:
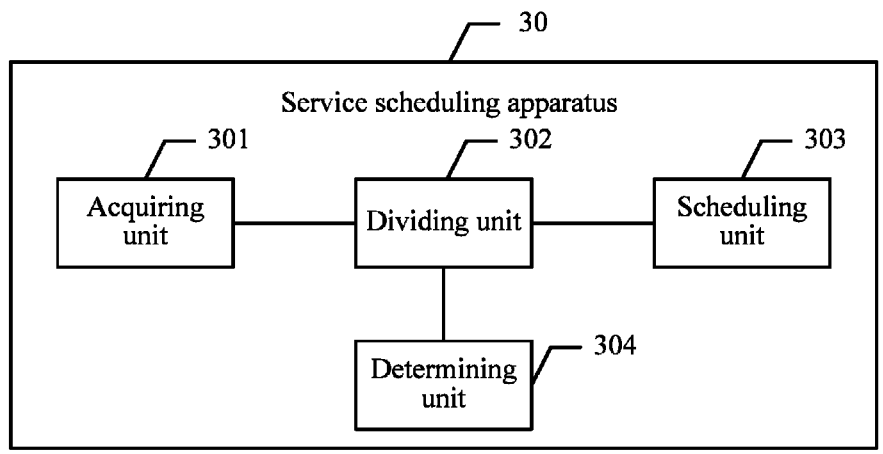
FIG. 9 is a schematic diagram of another embodiment of a service scheduling apparatus according to an embodiment of the present disclosure.

Optionally, based on the foregoing solution corresponding to FIG. 8, referring to FIG. 9, in a first optional solution of a service scheduling apparatus 30 provided in this embodiment of the present disclosure, the service scheduling apparatus 30 further includes: a determining unit 304 configured to, before the dividing unit 302 divides the stream computing application graph, determine a quantity of working nodes that are needed for processing the service corresponding to the stream computing application graph; and determine the division quantity according to the quantity of working nodes that are needed for processing the service.

Figure 10:
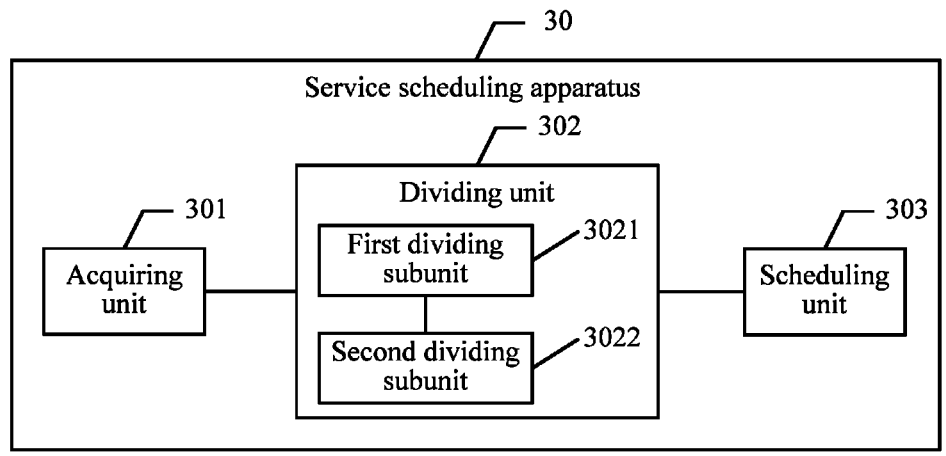
FIG. 10 is a schematic diagram of another embodiment of a service scheduling apparatus according to an embodiment of the present disclosure.

Optionally, based on the foregoing solution corresponding to FIG. 8, referring to FIG. 10, in a second optional solution of the service scheduling apparatus 30 provided in this embodiment of the present disclosure, the dividing unit 302 includes a first dividing subunit 3021 configured to perform first-time division on the stream computing application graph according to the operator degrees of the operators and the division quantity, to obtain first-time divided graphs; and a second dividing subunit 3022 configured to perform, according to the operator potentials, second-time division on the first-time divided graphs obtained by means of division by the first dividing subunit 3021, to obtain the divided sub-graphs.

Figure 11:
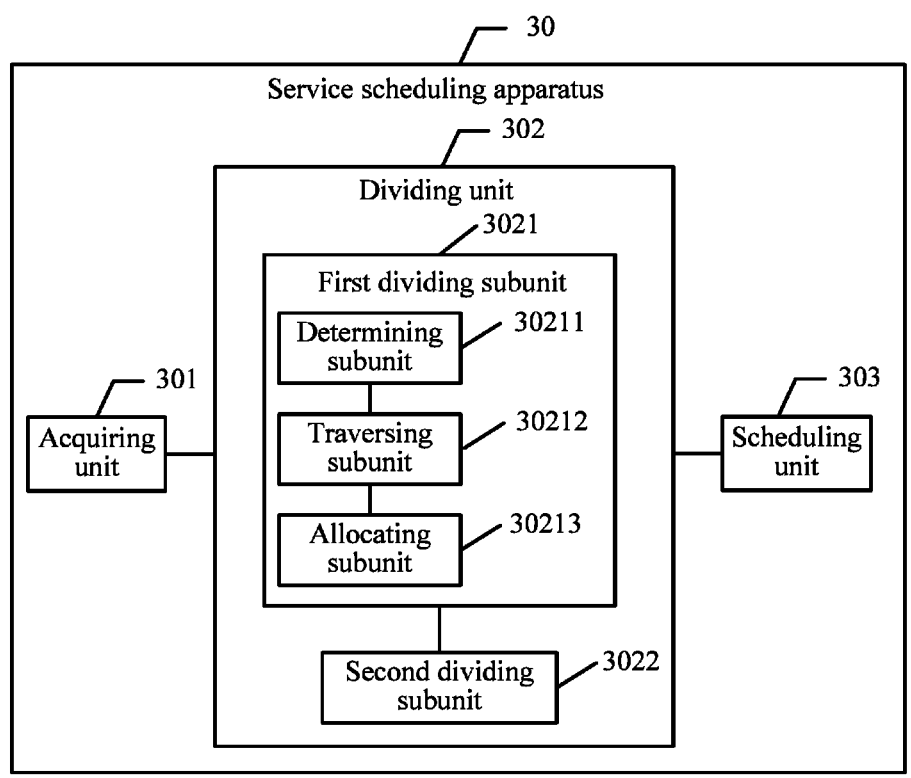
FIG. 11 is a schematic diagram of another embodiment of a service scheduling apparatus according to an embodiment of the present disclosure.

Optionally, based on the foregoing second optional solution corresponding to FIG. 10, referring to FIG. 11, in a third optional solution of the service scheduling apparatus 30 provided in this embodiment of the present disclosure, the first dividing subunit 3021 includes a determining subunit 30211 configured to determine center operators with a same quantity as the division quantity according to the operator degrees of the operators and the division quantity, where an operator degree of the center operator is at least greater than an operator degree of an operator connected to the center operator; a traversing subunit 30212 configured to traverse other operators except the center operators layer by layer using each center operator determined by the determining subunit 30211 as a traversal starting point, until another center operator except the center operator or a swing operator is traversed, where the swing operator is an operator that is traversed simultaneously during traversal using two adjacent center operators as starting points; and an allocating subunit 30213 configured to allocate, to the first-time divided graphs, operators that are traversed starting from the center operator and before the another center operator or the swing operator is traversed by the traversing subunit 30212.

Optionally, based on the foregoing third optional solution corresponding to FIG. 11, in a fourth optional solution of the service scheduling apparatus 30 provided in this embodiment of the present disclosure, the determining subunit 30211 is configured to determine core operators and ordinary operators in the stream computing application graph according to the operator degrees of the operators, where an operator degree of the core operator is higher than an operator degree of an operator connected to the core operator, and the ordinary operators are operators in the stream computing application graph except the core operators; and according to the division quantity, determine, from the core operators, the center operators with a same quantity as the division quantity, or determine, from a combination of the core operators and the ordinary operators, the center operators with a same quantity as the division quantity.

Optionally, based on the foregoing fourth optional solution, in a fifth optional solution of the service scheduling apparatus 30 provided in this embodiment of the present disclosure, the determining subunit 30211 is configured to, when a quantity of the core operators is not less than the quantity of the center operators, select core operators, with the division quantity, having largest operator degrees as the center operators.

Optionally, based on the foregoing fourth optional solution, in a sixth optional solution of the service scheduling apparatus 30 provided in this embodiment of the present disclosure, the determining subunit 30211 is configured to, when a quantity of the core operators is less than the quantity of the center operators, select ordinary operators having largest operator degrees as remaining center operators that cannot be provided by the core operators adequately.

Optionally, based on the foregoing third, fourth, fifth, and sixth optional solutions, in a seventh optional solution of the service scheduling apparatus 30 provided in this embodiment of the present disclosure, the second dividing subunit 3022 is configured to determine a graph partition potential of the first-time divided graph, where the graph partition potential is a cumulative sum of operator potentials of operators in the first-time divided graph; and determine, according to an operator potential of a swing operator between adjacent first-time divided graphs and graph partition potentials of the adjacent first-time divided graphs, a first-time divided graph to which the swing operator should be allocated, to obtain the divided sub-graphs.

Figure 12:
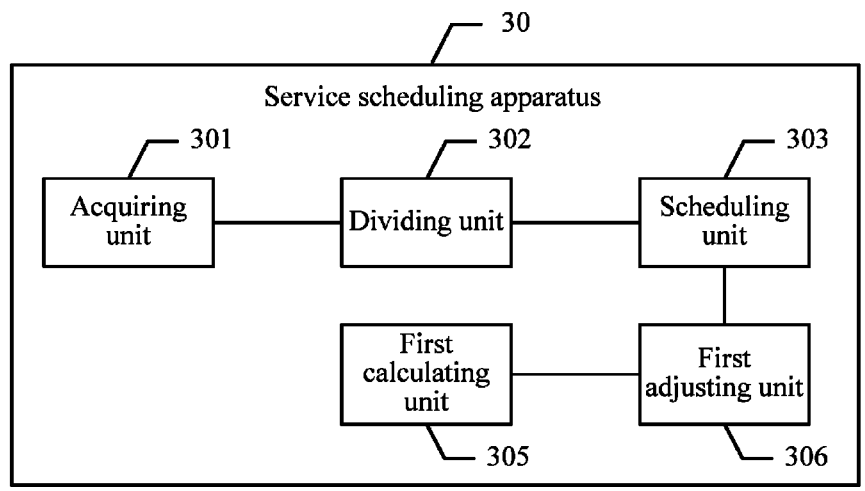
FIG. 12 is a schematic diagram of another embodiment of a service scheduling apparatus according to an embodiment of the present disclosure.

Optionally, based on the foregoing solution corresponding to FIG. 8, or any one of the first to the seventh optional solutions, in an eighth optional solution of the service scheduling apparatus 30 provided in this embodiment of the present disclosure, referring to FIG. 12, the apparatus further includes a first calculating unit 305 and a first adjusting unit 306, where the first calculating unit 305 is configured to calculate graph partition load, where the graph partition load is a sum of load of operators in the divided sub-graph, and calculate a load error value according to the graph partition load; and the first adjusting unit 306 is configured to, when the load error value calculated by the first calculating unit 305 is greater than a preset first check threshold, adjust the swing operator from the divided sub-graph to a divided sub-graph having a smallest load error value, to obtain adjusted divided sub-graphs, where the scheduling unit 303 is configured to schedule a sub-service corresponding to an operator included in each divided sub-graph adjusted by the first adjusting unit 306, to a working node corresponding to the adjusted divided sub-graph for processing.

Figure 13:
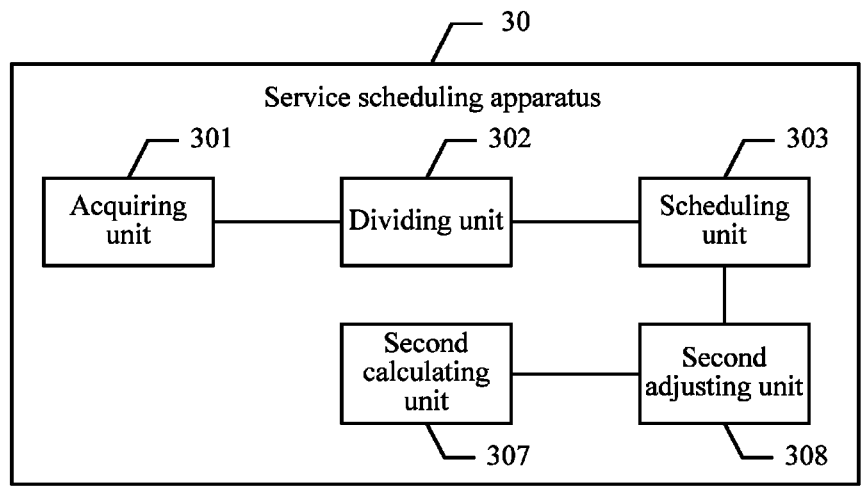
FIG. 13 is a schematic diagram of another embodiment of a service scheduling apparatus according to an embodiment of the present disclosure.

Optionally, based on the foregoing solution corresponding to FIG. 8, or any one of the first to the seventh optional solutions, in a ninth optional solution of the service scheduling apparatus 30 provided in this embodiment of the present disclosure, referring to FIG. 13, the apparatus further includes a second calculating unit 307 and a second adjusting unit 308, where the second calculating unit 307 is configured to calculate graph partition network input traffic, output traffic, indegree, and outdegree, where the graph partition network input traffic is input traffic of operators that are in the divided sub-graph and that receive data streams across a physical node, the graph partition network output traffic is output traffic of operators that are in the divided sub-graph and that send data streams across a physical node, the graph partition network indegree is a quantity of data streams received by operators that are in the divided sub-graph and that receive data streams across a physical node, and the graph partition network outdegree is a quantity of data streams sent by operators that are in the divided sub-graph and that send data streams across a physical node; and calculate a traffic error value according to the graph partition network input traffic, output traffic, indegree, and outdegree; and the second adjusting unit 308 is configured to, when the traffic error value calculated by the second calculating unit 307 is greater than a preset second check threshold, adjust the swing operator from the divided sub-graph to a divided sub-graph having a smallest traffic error value, to obtain adjusted divided sub-graphs, where the scheduling unit 303 is configured to schedule a sub-service corresponding to an operator included in each divided sub-graph adjusted by the second adjusting unit 308, to a working node corresponding to the adjusted divided sub-graph for processing.

The service scheduling apparatus provided in this embodiment of the present disclosure may be understood with reference to descriptions from FIG. 1 to FIG. 6, which is not described herein again.

Figure 14:
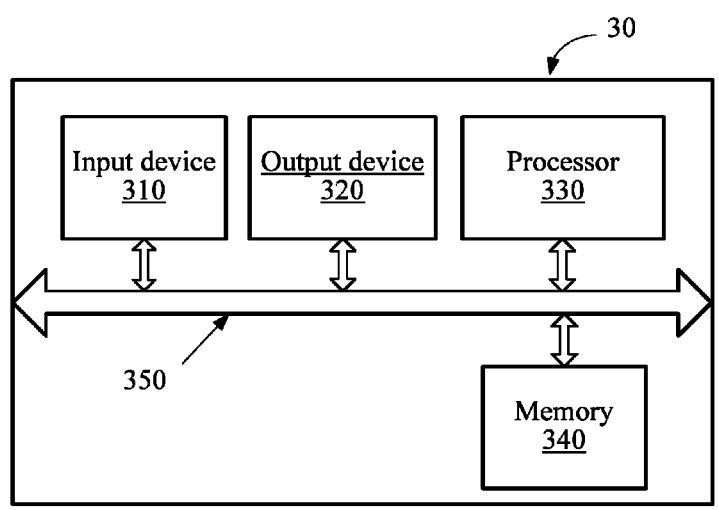
FIG. 14 is a schematic diagram of another embodiment of a service scheduling apparatus according to an embodiment of the present disclosure.

FIG. 14 is a schematic structural diagram of a service scheduling apparatus 30 according to an embodiment of the present disclosure. The service scheduling apparatus 30 may include an input device 310, an output device 320, a processor 330, and a memory 340.

The service scheduling apparatus 30 provided in this embodiment of the present disclosure is applied to a stream computing system. The stream computing system is configured to schedule and process a service, the stream computing system includes a master control node and multiple working nodes, and the master control node is configured to schedule sub-services included in the service to the multiple working nodes for processing.

The memory 340 may include a read only memory and a random access memory, and provides an instruction and data to the processor 330. A part of the memory 340 may further include a non-volatile random access memory (NVRAM). The memory 340 stores the following elements an executable module or a data structure, or a subset thereof, or an extended set thereof; operation instructions, including various operation instructions and used to implement various operations; and an operating system, including various system programs, and configured to implement various basic services and handle hardware-based tasks.

In this embodiment of the present disclosure, the processor 330 performs the following operations by invoking the operation instructions (the operation instructions may be stored in the operating system) stored in the memory 340: acquiring a stream computing application graph of the service, where the stream computing application graph is a logical relationship graph that is created in advance for the service and that includes operators and moving directions of data streams between the operators, and the operator in the stream computing application graph carries computational logic used for processing a sub-service that is in the service and that is corresponding to the operator; dividing the stream computing application graph according to operator degrees and operator potentials of the operators in the stream computing application graph and according to a division quantity for dividing the stream computing application graph, to obtain divided sub-graphs with the division quantity, where the operator degree is a cumulative sum of traffic weights of input-and-output traffic of the operator, and the operator potential is a load degree of the operator in the stream computing application graph; and scheduling a sub-service corresponding to an operator included in each divided sub-graph to a working node corresponding to the divided sub-graph for processing.

In this embodiment of the present disclosure, a stream computing application graph is divided according to operator degrees and operator potentials of operators in the stream computing application graph and according to a division quantity for dividing the stream computing application graph, to obtain divided sub-graphs with the division quantity; and a sub-service corresponding to an operator included in each divided sub-graph is scheduled to a working node corresponding to the divided sub-graph for processing, so that the service can use physical resources and network resources in a balanced manner, thereby improving utilization of the physical resources and network resources.

The processor 330 controls operations of the service scheduling apparatus 30. The processor 330 may also be referred to as a CPU. The memory 340 may include a read only memory and a random access memory, and provides an instruction and data to the processor 330. A part of the memory 340 may further include a NVRAM. In specific application, components of the service scheduling apparatus 30 are coupled together using a bus system 350. The bus system 350 not only includes a data bus, but also may include a power bus, a control bus, a status signal bus, and the like. However, for clear description, various buses in the figure are marked as the bus system 350.

The method disclosed in the foregoing embodiments of the present disclosure may be applied to the processor 330, or implemented by the processor 330. The processor 330 may be an integrated circuit chip and has a signal processing capacity. During implementation, steps of the foregoing method may be completed by an integrated logic circuit in a form of hardware or an instruction in a form of software in the processor 330. The foregoing processor 330 may be a general purpose processor, a digital signal processor (DSP), an application-specific integrated circuit (ASIC), a field programmable gate array (FPGA) or another programmable logic device, a discrete gate or a transistor logic device, or a discrete hardware component, which can implement or execute methods, steps and logical block diagrams disclosed in the embodiments of the present disclosure. The general purpose processor may be a microprocessor, or the processor may also be any conventional processor, or the like. Steps of the method disclosed in the embodiments of the present disclosure may be directly executed and completed by a hardware decoding processor, or executed and completed by a combination of hardware and software modules in the decoding processor. The software module may be located in a mature storage medium in the field such as a random memory, a flash memory, a read only memory, a programmable read only memory or an electrically erasable programmable memory, or a register. The storage medium is located in the memory 340. The processor 330 reads information from the memory 340, and completes steps of the foregoing method in combination with hardware of the processor.

Optionally, the processor 330 is further configured to, before dividing the stream computing application graph, determine a quantity of working nodes that are needed for processing the service corresponding to the stream computing application graph; and determine the division quantity according to the quantity of working nodes that are needed for processing the service.

Optionally, the processor 330 is configured to perform first-time division on the stream computing application graph according to the operator degrees of the operators and the division quantity, to obtain first-time divided graphs; and perform second-time division on the first-time divided graphs according to the operator potentials, to obtain the divided sub-graphs.

Optionally, the processor 330 is configured to determine center operators with a same quantity as the division quantity according to the operator degrees of the operators and the division quantity, where an operator degree of the center operator is at least greater than an operator degree of an operator connected to the center operator; traverse other operators except the center operators layer by layer using each center operator as a traversal starting point, until another center operator except the center operator or a swing operator is traversed, where the swing operator is an operator that is traversed simultaneously during traversal using two adjacent center operators as starting points; and allocate, to the first-time divided graphs, operators that are traversed starting from the center operator and before the another center operator or the swing operator is traversed.

Optionally, the processor 330 is configured to determine core operators and ordinary operators in the stream computing application graph according to the operator degrees of the operators, where an operator degree of the core operator is higher than an operator degree of an operator connected to the core operator, and the ordinary operators are operators in the stream computing application graph except the core operators; and according to the division quantity, determine, from the core operators, the center operators with a same quantity as the division quantity, or determine, from a combination of the core operators and the ordinary operators, the center operators with a same quantity as the division quantity.

Optionally, the processor 330 is configured to, when a quantity of the core operators is not less than the quantity of the center operators, select core operators, with the division quantity, having largest operator degrees as the center operators.

Optionally, the processor 330 is configured to, when a quantity of the core operators is less than the quantity of the center operators, select ordinary operators having largest operator degrees as remaining center operators that cannot be provided by the core operators adequately.

Optionally, the processor 330 is configured to determine a graph partition potential of the first-time divided graph, where the graph partition potential is a cumulative sum of operator potentials of operators in the first-time divided graph; and determine, according to an operator potential of a swing operator between adjacent first-time divided graphs and graph partition potentials of the adjacent first-time divided graphs, a first-time divided graph to which the swing operator should be allocated, to obtain the divided sub-graphs.

Optionally, the processor 330 is further configured to calculate graph partition load, where the graph partition load is a sum of load of operators in the divided sub-graph; calculate a load error value according to the graph partition load; and when the load error value is greater than a preset first check threshold, adjust the swing operator from the divided sub-graph to a divided sub-graph having a smallest load error value, to obtain adjusted divided sub-graphs.

The processor 330 is configured to schedule a sub-service corresponding to an operator included in each adjusted divided sub-graph to a working node corresponding to the adjusted divided sub-graph for processing.

Optionally, the processor 330 is further configured to calculate graph partition network input traffic, output traffic, indegree, and outdegree; where the graph partition network input traffic is input traffic of operators that are in the divided sub-graph and that receive data streams across a physical node, the graph partition network output traffic is output traffic of operators that are in the divided sub-graph and that send data streams across a physical node, the graph partition network indegree is a quantity of data streams received by operators that are in the divided sub-graph and that receive data streams across a physical node, and the graph partition network outdegree is a quantity of data streams sent by operators that are in the divided sub-graph and that send data streams across a physical node; calculate a traffic error value according to the graph partition network input traffic, output traffic, indegree, and outdegree; and when the traffic error value is greater than a preset second check threshold, adjust the swing operator from the divided sub-graph to a divided sub-graph having a smallest traffic error value, to obtain adjusted divided sub-graphs.

The processor 330 is configured to schedule a sub-service corresponding to an operator included in each adjusted divided sub-graph to a working node corresponding to the adjusted divided sub-graph for processing.

Figure 15:
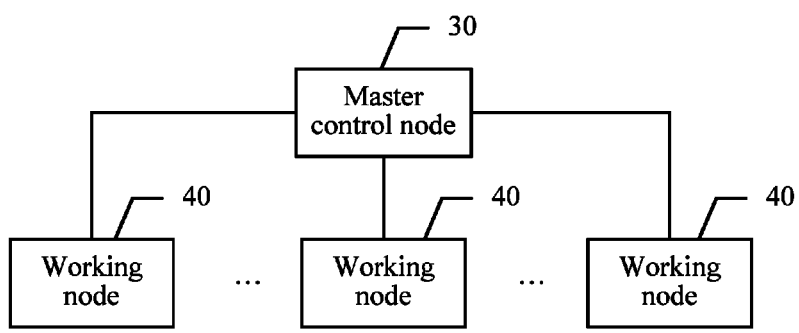
FIG. 15 is a schematic diagram of an embodiment of a stream computing system according to an embodiment of the present disclosure.

Referring to FIG. 15, this embodiment of the present disclosure provides a stream computing system. The stream computing system is configured to schedule and process a service, the stream computing system includes a master control node 30 and multiple working nodes 40, and the master control node 30 is configured to schedule sub-services included in the service to the multiple working nodes 40 for processing.

The master control node 30 is configured to acquire a stream computing application graph of the service, where the stream computing application graph is a logical relationship graph that is created in advance for the service and that includes operators and moving directions of data streams between the operators, and the operator in the stream computing application graph carries computational logic used for processing a sub-service that is in the service and that is corresponding to the operator; divide the stream computing application graph according to operator degrees and operator potentials of the operators in the stream computing application graph and according to a division quantity for dividing the stream computing application graph, to obtain divided sub-graphs with the division quantity, where the operator degree is a cumulative sum of traffic weights of input-and-output traffic of the operator, and the operator potential is a load degree of the operator in the stream computing application graph; and scheduling a sub-service corresponding to an operator included in each divided sub-graph to a working node corresponding to the divided sub-graph for processing.

Compared with the prior art in which unbalanced use of resources occurs when a service is deployed to a stream platform for running, the stream computing system provided in this embodiment of the present disclosure can enable the service to use physical resources and network resources in a balanced manner, thereby improving utilization of the physical resources and network resources.

This embodiment of the present disclosure further provides a computer storage medium. The computer storage medium may store a program. When the program is run, all or some of steps of the service scheduling method recorded in the foregoing method embodiments are performed.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also understand that the embodiments described in this specification all belong to exemplary embodiments, and the involved actions and modules are not necessarily mandatory to the present disclosure.

In the foregoing embodiments, the description of each embodiment has respective focuses. For a part that is not described in detail in an embodiment, reference may be made to related descriptions in other embodiments.

In the several embodiments provided in the present application, it should be understood that the disclosed apparatus may be implemented in other manners. For example, the described apparatus embodiment is merely exemplary. For example, the unit partition is merely logical function partition and may be other partition in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present disclosure. The foregoing storage medium includes any medium that can store program code, such as a universal serial bus (USB) flash drive, a read-only memory (ROM), a random access memory (RAM), a removable hard disk, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A service scheduling method for a stream computing system configured to schedule and process a service, wherein the method comprises:
   acquiring a stream computing application graph of the service, wherein the stream computing application graph is a logical relationship graph that is created in advance for the service, wherein the stream computing application graph comprises operators and moving directions of data streams between the operators, and wherein the operator in the stream computing application graph comprises computational logic used for processing a sub-service that is in the service and corresponds to the operator;
   determining center operators with a same quantity as a division quantity according to operator degrees of the operators and the division quantity;

dividing the stream computing application graph using the determined center operators according to the operator degrees and operator potentials of the operators in the stream computing application graph and according to the division quantity for dividing the stream computing application graph, to obtain divided sub-graphs with the division quantity, wherein the operator degree is a cumulative sum of traffic weights of input-and-output traffic of the operator, and wherein the operator potential is a load degree of the operator in the stream computing application graph; and scheduling a sub-service corresponding to an operator comprised in each divided sub-graph to a working node corresponding to the divided sub-graph for processing.

2. The method according to claim 1, wherein before dividing the stream computing application graph according to the operator degrees and the operator potentials of the operators in the stream computing application graph and according to the division quantity for dividing the stream computing application graph, the method further comprises:
determining a quantity of working nodes that are needed for processing the service corresponding to the stream computing application graph; and
determining the division quantity according to the quantity of working nodes that are needed for processing the service.

3. The method according to claim 1, wherein dividing the stream computing application graph according to the operator degrees and the operator potentials of the operators in the stream computing application graph and according to the division quantity for dividing the stream computing application graph comprises:
performing first-time division on the stream computing application graph according to the operator degrees of the operators and the division quantity, to obtain first-time divided graphs; and
performing second-time division on the first-time divided graphs according to the operator potentials, to obtain the divided sub-graphs.

4. The method according to claim 3, wherein performing the first-time division on the stream computing application graph according to the operator degrees of the operators and the division quantity, to obtain first-time divided graphs comprises:
determining the center operators with an operator degree of the center operator that is at least greater than an operator degree of an operator connected to the center operator;
traversing other operators except the center operators layer by layer using each center operator as a traversal starting point, until another center operator except the center operator or a swing operator is traversed, wherein the swing operator is an operator that is traversed simultaneously during traversal using two adjacent center operators as starting points; and
allocating, to the first-time divided graphs, operators that are traversed starting from the center operator and before the another center operator or the swing operator is traversed.

5. The method according to claim 4, wherein determining the center operators with the same quantity as the division quantity according to the operator degrees of the operators and the division quantity comprises:
determining core operators and ordinary operators in the stream computing application graph according to the operator degrees of the operators, wherein an operator degree of the core operator is higher than an operator degree of an operator connected to the core operator, and wherein the ordinary operators are operators in the stream computing application graph except the core operators; and
determining the center operators with the same quantity as the division quantity from either the core operators and according to the division quantity, or a combination of the core operators and the ordinary operators and according to the division quantity.

6. The method according to claim 5, wherein determining, from the core operators, the center operators with the same quantity as the division quantity comprises selecting core operators, with the division quantity, having largest operator degrees as the center operators when a quantity of the core operators is not less than the quantity of the center operators.

7. The method according to claim 5, wherein determining, from the combination of the core operators and the ordinary operators, the center operators with the same quantity as the division quantity comprises selecting ordinary operators having largest operator degrees as remaining center operators that cannot be provided by the core operators adequately when a quantity of the core operators is less than the quantity of the center operators.

8. The method according to claim 4, wherein performing the second-time division on the first-time divided graphs according to the operator potentials, to obtain the divided sub-graphs comprises:
determining a graph partition potential of each first-time divided graph, wherein the graph partition potential is a cumulative sum of operator potentials of operators in the first-time divided graph; and
determining, according to an operator potential of a swing operator between adjacent first-time divided graphs and graph partition potentials of the adjacent first-time divided graphs, a first-time divided graph to which the swing operator should be allocated, to obtain the divided sub-graphs.

9. The method according to claim 1, further comprising:
calculating a graph partition load, wherein the graph partition load is a sum of load of operators in the divided sub-graph;
calculating a load error value according to the graph partition load; and
adjusting, when the load error value is greater than a preset first check threshold, a swing operator from the divided sub-graph to a divided sub-graph having a smallest load error value, to obtain adjusted divided sub-graphs, wherein scheduling the sub-service comprises scheduling a sub-service corresponding to an operator comprised in each adjusted divided sub-graph to a working node corresponding to the adjusted divided sub-graph for processing.

10. The method according to claim 1, further comprising:
calculating graph partition network input traffic, graph partition network output traffic, graph partition network indegree, and graph partition network outdegree, wherein the graph partition network input traffic is input traffic of operators that are in the divided sub-graph and that receive data streams across a physical node, wherein the graph partition network output traffic is output traffic of operators that are in the divided sub-graph and that send data streams across a physical node, wherein the graph partition network indegree is a quantity of data streams received by operators that are in the divided sub-graph and that receive data streams across a physical node, and wherein the graph partition network outdegree is a quantity of data streams sent by operators that are in the divided sub-graph and that send data streams across a physical node;

calculating a traffic error value according to the graph partition network input traffic, output traffic, indegree, and outdegree; and adjusting a swing operator from the divided sub-graph to a divided sub-graph having a smallest traffic error value, when the traffic error value is greater than a preset second check threshold, to obtain adjusted divided sub-graphs, wherein the scheduling the sub-service corresponding to the operator comprised in each divided sub-graph to the working node corresponding to the divided sub-graph for processing comprises scheduling a sub-service corresponding to an operator comprised in each adjusted divided sub-graph to a working node corresponding to the adjusted divided sub-graph for processing.

11. A service scheduling apparatus configured to schedule and process a service, wherein the apparatus comprises:
a master control node, wherein the master control node is configured to schedule sub-services comprised in the service to multiple working nodes for processing, wherein the master control node comprises:
a memory comprising instructions; and
a processor coupled to the memory, wherein the instructions cause the memory to be configured to:
acquire a stream computing application graph of the service, wherein the stream computing application graph is a logical relationship graph that is created in advance for the service, wherein the stream computing application graph comprises operators and moving directions of data streams between the operators, and wherein the operator in the stream computing application graph comprises computational logic used for processing a sub-service that is in the service and that is corresponding to the operator;
determine center operators with a same quantity as a division quantity according to operator degrees of the operators and the division quantity;
divide the stream computing application graph using the determined center operators according to the operator degrees and operator potentials of the operators in the stream computing application graph, and according to the division quantity for dividing the stream computing application graph, to obtain divided sub-graphs with the division quantity, wherein the operator degree is a cumulative sum of traffic weights of input-and-output traffic of the operator, and wherein the operator potential is a load degree of the operator in the stream computing application graph; and
schedule a sub-service corresponding to an operator comprised in each divided sub-graph obtained by means of division, to a working node corresponding to the divided sub-graph for processing.

12. The apparatus according to claim 11, wherein the instructions further cause the processor to be configured to:
determine, before dividing the stream computing application graph, a quantity of working nodes that are needed for processing the service corresponding to the stream computing application graph; and
determine the division quantity according to the quantity of working nodes that are needed for processing the service.

13. The apparatus according to claim 11, wherein the instructions further cause the processor to be configured to:

perform first-time division on the stream computing application graph according to the operator degrees of the operators and the division quantity, to obtain first-time divided graphs; and
perform, according to the operator potentials, second-time division on the first-time divided graphs obtained by means of division, to obtain the divided sub-graphs.

14. The apparatus according to claim 13, wherein the instructions further cause the processor to be configured to:
determine center operators with a same quantity as the division quantity according to the operator degrees of the operators and the division quantity, wherein an operator degree of the center operator is at least greater than an operator degree of an operator connected to the center operator;
traverse other operators except the center operators layer by layer using each center operator as a traversal starting point, until another center operator except the center operator or a swing operator is traversed, wherein the swing operator is an operator that is traversed simultaneously during traversal using two adjacent center operators as starting points; and
allocate, to the first-time divided graphs, operators that are traversed starting from the center operator and before the another center operator or the swing operator is traversed.

15. The apparatus according to claim 14, wherein the instructions further cause the processor to be configured to:
determine core operators and ordinary operators in the stream computing application graph according to the operator degrees of the operators, wherein an operator degree of the core operator is higher than an operator degree of an operator connected to the core operator, and wherein the ordinary operators are operators in the stream computing application graph except the core operators; and
determine the center operators with a same quantity as the division quantity from either the core operators, or a combination of the core operators and the ordinary operators.

16. The apparatus according to claim 15, wherein the instructions further cause the processor to be configured to select core operators, with the division quantity, having largest operator degrees as the center operators when a quantity of the core operators is not less than the quantity of the center operators.

17. The apparatus according to claim 15, wherein the instructions further cause the processor to be configured to select ordinary operators having largest operator degrees as remaining center operators that cannot be provided by the core operators adequately when a quantity of the core operators is less than the quantity of the center operators.

18. The apparatus according to claim 14, wherein the instructions further cause the processor to be configured to:
determine a graph partition potential of the first-time divided graph, wherein the graph partition potential is a cumulative sum of operator potentials of operators in the first-time divided graph; and
determine, according to an operator potential of a swing operator between adjacent first-time divided graphs and graph partition potentials of the adjacent first-time divided graphs, a first-time divided graph to which the swing operator should be allocated, to obtain the divided sub-graphs.

19. The apparatus according to claim 11, wherein the instructions further cause the processor to be configured to:

calculate graph partition load, wherein the graph partition load is a sum of load of operators in the divided sub-graph, and calculate a load error value according to the graph partition load; and adjust a swing operator from the divided sub-graph to a divided sub-graph having a smallest load error value, when the calculated load error value is greater than a preset first check threshold, to obtain adjusted divided sub-graphs, schedule a sub-service corresponding to an operator comprised in each adjusted divided sub-graph, to a working node corresponding to the adjusted divided sub-graph for processing.

20. The apparatus according to claim 11, wherein the instructions further cause the processor to be configured to:

calculate graph partition network input traffic, graph partition network output traffic, graph partition network indegree, and graph partition network outdegree, wherein the graph partition network input traffic is input traffic of operators that are in the divided sub-graph and that receive data streams across a physical node, wherein the graph partition network output traffic is output traffic of operators that are in the divided sub-graph and that send data streams across a physical node, wherein the graph partition network indegree is a quantity of data streams received by operators that are in the divided sub-graph and that receive data streams across a physical node, wherein the graph partition network outdegree is a quantity of data streams sent by operators that are in the divided sub-graph and that send data streams across a physical node:

calculate a traffic error value according to the graph partition network input traffic, the graph partition network output traffic, the graph partition network indegree, and the graph partition network outdegree;

adjust a swing operator from the divided sub-graph to a divided sub-graph having a smallest traffic error value, when the calculated traffic error value is greater than a preset second check threshold, to obtain adjusted divided sub-graphs;

schedule a sub-service corresponding to an operator comprised in each divided sub-graph, to a working node corresponding to the adjusted divided sub-graph for processing.

21. A stream computing system configured to schedule and process a service, wherein the stream computing system comprises:

a master control node, wherein the master control node is configured to schedule sub-services comprised in the service to multiple working nodes for processing, and wherein the master control node comprises:

a memory comprising instructions; and a processor coupled to the memory, wherein the instructions cause the memory to be configured to:

acquire a stream computing application graph of the service, wherein the stream computing application graph is a logical relationship graph that is created in advance for the service, wherein the stream computing application graph comprises operators and moving directions of data streams between the operators, and the operator in the stream computing application graph comprises computational logic used for processing a sub-service that is in the service and that is corresponding to the operator;

determine center operators with a same quantity as a division quantity according to operator degrees of the operators and the division quantity;

divide the stream computing application graph using the determined center operators according to the operator degrees and operator potentials of the operators in the stream computing application graph and according to the division quantity for dividing the stream computing application graph, to obtain divided sub-graphs with the division quantity, wherein the operator degree is a cumulative sum of traffic weights of input-and-output traffic of the operator, and the operator potential is a load degree of the operator in the stream computing application graph; and schedule a sub-service corresponding to an operator comprised in each divided sub-graph to a working node corresponding to the divided sub-graph for processing.

* * * * *